US007693780B2

(12) United States Patent
Stearns

(10) Patent No.: US 7,693,780 B2
(45) Date of Patent: Apr. 6, 2010

(54) TRADING SYSTEM AND METHOD HAVING A CONFIGURABLE MARKET DEPTH TOOL WITH DYNAMIC PRICE AXIS

(75) Inventor: Franklin R Stearns, Libertyville, IL (US)

(73) Assignee: MF Global Inc., New York, NY (US)

( * ) Notice: Subject to any disclaimer, the term of this patent is extended or adjusted under 35 U.S.C. 154(b) by 209 days.

(21) Appl. No.: 11/681,967

(22) Filed: Mar. 5, 2007

(65) Prior Publication Data

US 2010/0030678 A9 Feb. 4, 2010

Related U.S. Application Data

(63) Continuation-in-part of application No. 11/367,689, filed on Mar. 3, 2006.

(60) Provisional application No. 60/778,728, filed on Mar. 3, 2006, provisional application No. 60/658,944, filed on Mar. 4, 2005.

(51) Int. Cl.
  *G06Q 40/00* (2006.01)
(52) U.S. Cl. .......................................... 705/37; 345/619
(58) Field of Classification Search .................... 705/37
  See application file for complete search history.

(56) References Cited

U.S. PATENT DOCUMENTS

| 7,243,083 | B2 * | 7/2007 | Burns et al. | 705/37 |
| 2003/0009411 | A1 * | 1/2003 | Ram et al. | 705/37 |
| 2003/0200167 | A1 * | 10/2003 | Kemp et al. | 705/37 |
| 2004/0093300 | A1 * | 5/2004 | Burns | 705/37 |
| 2004/0117292 | A1 | 6/2004 | Brumfield et al. | |
| 2006/0020538 | A1 * | 1/2006 | Ram et al. | 705/37 |
| 2007/0005481 | A1 * | 1/2007 | Kedia et al. | 705/37 |
| 2007/0271171 | A1 * | 11/2007 | Lutnick et al. | 705/37 |
| 2008/0162378 | A1 * | 7/2008 | Levine et al. | 705/36 R |
| 2008/0183639 | A1 * | 7/2008 | DiSalvo | 705/36 R |

OTHER PUBLICATIONS

International Search Report and the Written Opinion of the International Searching Authority dated Oct. 25, 2007.
International Preliminary Examination Report dated Jan. 2, 2009 from PCT/US07/63282.
International Preliminary Report on Patentability and the Written Opinion of the International Search Authority dated Sep. 27, 2007, from the corresponding International Application.
International Search Report and the Written Opinion of the International Searching Authority dated Aug. 22, 2007, from the corresponding International Application.
United States Office Action dated Feb. 26, 2009, from the corresponding United States Application.

* cited by examiner

*Primary Examiner*—Hani Kazimi
*Assistant Examiner*—Olabode Akintola
(74) *Attorney, Agent, or Firm*—Katten Muchin Rosenman LLP

(57) ABSTRACT

A system and method for the electronic trading of investment vehicles, such as stocks, bonds, options, commodities, stock and futures index contracts, and the like, is disclosed. The system and method provide a graphical user interface having a versatile and efficient market depth tool with a dynamic price axis for executing trades. The tool facilitates the display of and the rapid placement of trade orders within the market. The system provides for user initiated functionality to control, among other things, the manner in which the dynamic price axis moves in response to market conditions.

5 Claims, 18 Drawing Sheets

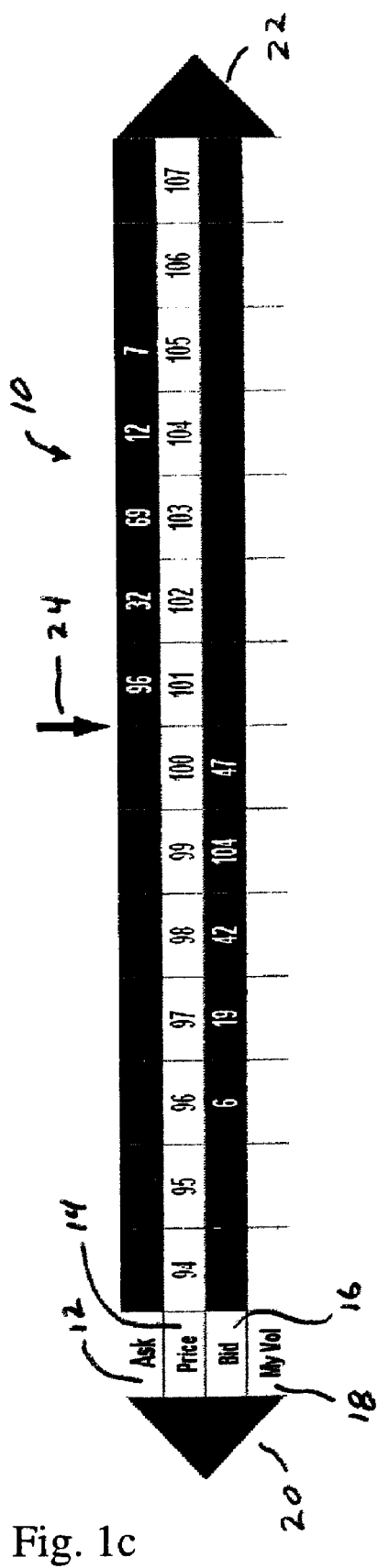
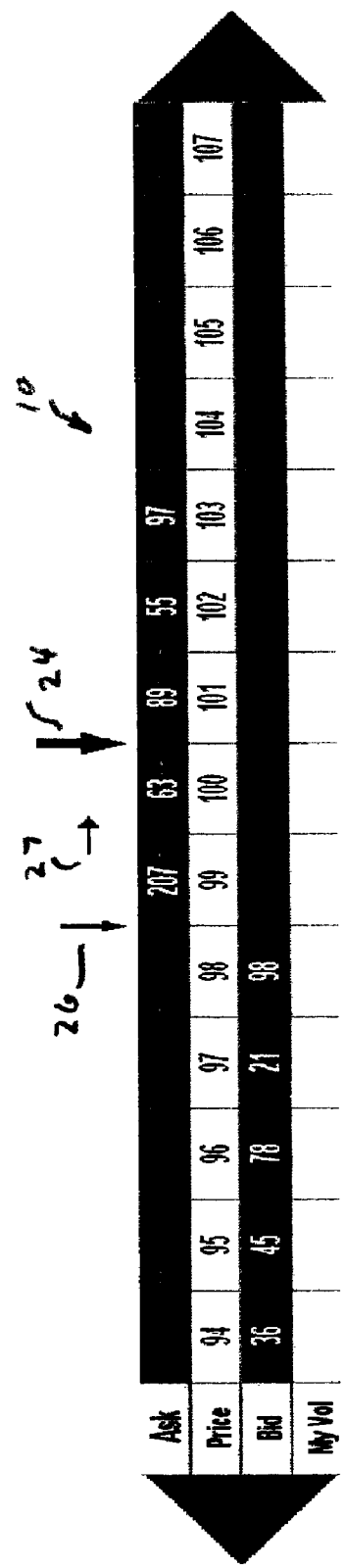
Fig. 1c
Fig. 1d

Delay Interval Calculated using either constant or variable rate algorithm. Both of these algorithms are described in "Convergence Speed" section of this document.

TRADING SYSTEM AND METHOD HAVING A CONFIGURABLE MARKET DEPTH TOOL WITH DYNAMIC PRICE AXIS

This application which claims the benefit of U.S. Provisional Application Ser. No. 60/778,728, filed Mar. 3, 2006, is a continuation-in-part application of prior Application No. 11/367,689, filed March 3, 2006, which claims the benefit of U.S. Provisional Application Ser. No. 60/658,944, filed Mar. 4, 2005.

FIELD OF INVENTION

This invention relates generally to a system and method for the electronic trading of investment vehicles, such as stocks, bonds, options, commodities, stock and futures index contracts, and the like, and in particular to an electronic trading system and method with a graphical user interface having a versatile and efficient market depth tool with a dynamic price axis for executing trades. The tool facilitates the display of and the rapid placement of trade orders within the market trading depth of an investment vehicle, where such a vehicle includes anything that can be traded with quantities and/or prices.

BACKGROUND OF INVENTION

Many exchanges throughout the world use electronic trading processes to trade stocks, bonds, futures, options and other products. These electronic exchanges typically have three components: mainframe computers (host), communications servers, and the exchange participants' computers (client). The host's operations cover order-matching, maintaining order books and positions, price information, and managing and updating the database for the online trading day as well as nightly data runs. The host is also equipped with external interfaces that ideally maintain uninterrupted online contact to quote vendors and other price information systems.

Traders can link to the host through, among other things, high speed data lines, high speed communications servers and the Internet, for direct connections between the client and the host. Data is transmitted in both directions between traders and exchanges via high speed communication channels.

Irrespective of the way in which a connection is established, the exchange participants' computers allow traders to participate in the market. The traders use software that creates specialized interactive trading screens on the traders' workstations or desktops. The trading screens enable traders to enter and execute orders, obtain market quotes, and monitor positions. The range and quality of features available to traders on their screens varies according to the specific software application being used.

The present exchanges, such as the stock, bond, futures and options exchanges, have volatile products with prices that move rapidly. To profit in these markets, traders must be able to react quickly and even a slight speed advantage obtained from user friendly, rapidly efficient software, fast communications capabilities, and other factors, can generate significant financial returns in a fast moving market. A trader lacking a technologically advanced interface to trade in such markets is at a severe competitive disadvantage in the present trading environment.

Irrespective of what interface a trader uses to enter orders in the market, each market supplies and requires the same information to and from every trader. The bids (an offer to buy) and asks (an offer to sell) in the market make up the market data and those trading in that market receive this information if it is provided by the respective exchange. Similarly, exchanges require that certain information be included in each order. For example, traders must supply information such as the name of the vehicle being traded, quantity, restrictions, price and multiple other variables. Without all of this information, the market will not accept the order. This input and output of information is the same for every trader for a specific vehicle being traded.

With these variables being constant, a competitive speed advantage must come from other aspects of the trading cycle, such as the type and functionality of the interface, or trading tool, used by the trader to buy or sell the financial instrument, or vehicle, of interest.

In existing systems, multiple elements of an order must be entered prior to an order being sent to market, which can be time consuming for the trader. Such elements include the commodity symbol, the desired price, the quantity and whether a buy or a sell order is desired. The more time it takes a trader to enter an order, the more likely the price on which he wanted to bid or ask will change or not be available in the market because the market is fluid and many traders typically send orders to the market simultaneously. Indeed, a successful market strives to have such a high volume of trading that any trader who wishes to enter an order will find a match and have the order filled quickly, if not immediately. In such liquid markets, the prices of the vehicles can fluctuate rapidly. On a trading screen, this results in rapid changes in the price and quantity fields within the grid defining the active trading data for that vehicle. If a trader intends to enter an order at a particular price, but misses the price because the market prices moved before the order could be entered, the trader may lose hundreds or thousands of dollars on that trade. The faster a trader can trade, the less likely it will be that he or she will miss the desired buy/sell price.

Present trading systems contain numerous ways of displaying the depth of a market for a particular trading vehicle. These systems either anchor inside market prices to a central axis, or move market depth along a static display of ordered prices. Users of the former type of system run the risk that an instantaneous change in price that occurs simultaneously with a command to submit or withdraw an order may result in an unwanted execution of the order (either a buy or sell) at an undesired price. In the latter type of system, the inside market prices can easily drift off the user's screen when the range of prices on screen no longer corresponds to any prices in the inside market, thereby requiring the user to execute a recentering command. Accordingly, there is a need for an improved market depth trading tool that addresses the disadvantages of existing systems. Other needs will become apparent upon reading the following description, taken in conjunction with the drawings.

SUMMARY OF THE INVENTION

The present invention relates generally a system and method for the electronic trading of investment vehicles. The system and method provide a market depth convergence tool useful to provide order entry and order cancellation functionality for the trading of financial products and vehicles such as stocks, bonds, options, commodities, futures, stock and future index contracts, and the like. The tool advantageously provides flexible and configurable systems, mechanisms and methods for establishing the appearance and functionality of the tool and for automatically centering a central market price upon a specified point or area within a graphical user interface display. Advantageously, the market depth tool may be represented by a plurality of axes, oriented horizontally, vertically, or in some other relationship, with a first axis (which could be a row or a column) representative of prices of the vehicle being traded, a second axis (which could be a row or a column) representative of bid volume and a third axis (which could be a row or a column) representative of ask volume. The disclosed market depth convergence tool allows values in a price axis to dynamically and gradually move back towards a pre-set convergence point or area in the graphical user interface display area when the central market point changes, with such movement being definable by the system user.

The trading system and method of one embodiment of the present invention provides a graphical user interface (hereinafter "GUI") having a market depth convergence tool that provides order entry and order cancellation functionality, preferably with a click of a user input device, such as a computer mouse or computer key, and also provides flexible and configurable mechanisms for automatically converging the central market point (which may represent the inside market price) upon a specified point within a graphical display area. With the convergence tool of one embodiment, the values in the price axis dynamically converge upon a convergence point on the GUI display so that the central market point will move toward a location that is within the trader's field of view on the screen. This convergence can be gradual or instantaneous, depending on trader preferences and settings. Thus, when there is a change in the central market point, as will happen when the inside market price changes during the trading of the financial vehicle, that point will move towards a pre-defined location on the graphical user interface display in a manner as may be defined by the system user.

In the event of an instantaneous convergence of the central market point on the convergence point, the central market point will be anchored on the convergence point such that market depth is static and market prices will change automatically to adjust for changes in the central market point. Although some traders may prefer this approach and trading interface, it remains possible that the inside market price could increase or decrease just milliseconds before a trader sends a buy or sell order into the market. In this case the trader risks buying or selling at a price level other than the intended price.

A gradual convergence of the central market point upon the convergence point provides the benefits of automatically, and preferably gradually, positioning the central market point in alignment with the convergence point thereby reducing risks associated with an instantaneous shift in underlying price levels of the trading vehicle. The trader is able to set the velocity (or speed) of this convergence at a level with which the individual trader is comfortable.

The market depth convergence tool thus permits a user to set a convergence point on a graphical user interface display upon which the central market point will converge, and to determine the speed at which the central market point will converge upon the convergence point when they become separated. The central market point, may be moved away from the defined convergence point due to a change in the inside market price or by the user manually moving it to another location on (or off of) the graphical user interface display area, or in other ways described below.

Other advantages and features of the present invention will become apparent in view of the description below, taken in conjunction with the drawings. It should be appreciated that the above and following descriptions address a financial instrument or vehicle that is being traded and are intended to cover all types of instruments or vehicles that may be traded on an electronic trading exchange and not any specific bond, stock, option, commodity, stock or futures index contract, etc.

BRIEF DESCRIPTION OF THE DRAWINGS

The following figures depict exemplary embodiments of the system and method disclosed herein. In FIGS. 1 through 15, identical reference numbers refer to the same elements in the respective figures.

FIG. 1c shows a portion of a representative computer screen of FIG. 1b with a graphical user interface having a horizontal market depth convergence tool according to one embodiment of the present invention, with the central market point aligned with a convergence point.

FIG. 1d shows a portion of the computer screen of FIG. 1b in which the central market point is not aligned with the convergence point.

FIGS. 2a-2c show a progression of movement of the central market point to the convergence point in the graphical user interface of FIG. 1.

FIGS. 3a-3e show a series graphical user interfaces with a vertical market depth convergence tool according to one embodiment of the present invention, depicting the alignment, movement, and realignment of the central market point and the convergence point.

FIG. 5 is a flow chart showing a variable rate control of the convergence of the central market point on the convergence point by varying the number of pixels, or price levels, over which the central market point moves per unit of time.

FIG. 6 is a flow chart showing a variable rate control of the convergence of the central market point on the convergence point by varying the length of time for each successive iterative move while keeping the distance moved constant.

FIG. 7 shows a high-level flow diagram of the functionality of the trading system of one embodiment of the present invention.

FIG. 8 shows a flow diagram of the monitoring process of the trading system of one embodiment of the present invention which initiates a convergence of the central market point on the convergence point.

FIG. 10 shows a flow diagram of the converge pixel(s) process of the trading system of one embodiment of the present invention.

FIG. 11 shows a user control to control the speed and manner in which the central market point converges on the convergence point.

FIG. 12 shows the user control of FIG. 11 with a drop-down menu.

FIG. 13 shows the alignment, movement and realignment of the central market point and the convergence point on a vertical display of the market depth tool.

FIG. 14 shows the placement of an order with a market depth convergence tool according to one embodiment of the present invention.

FIG. 15 shows the cancellation of an order with a market depth convergence tool according to one embodiment of the present invention.

DESCRIPTION OF A PREFERRED EMBODIMENT OF THE INVENTION

Figure 1A:
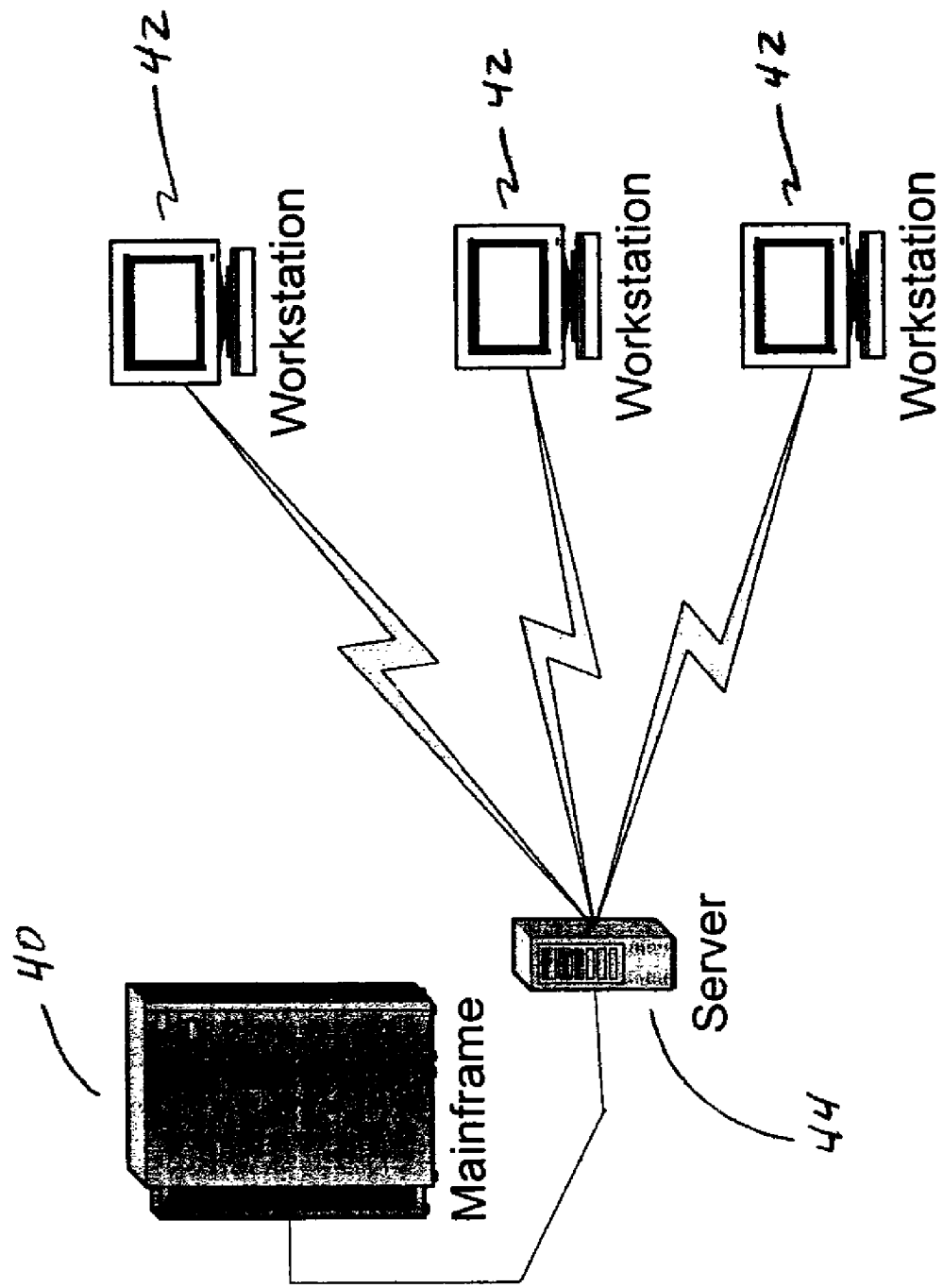
FIG. 1a shows a typically electronic exchange having a mainframe and one or more servers in two-way communication with trader workstations.

While the present invention is capable of embodiment in various forms, there is shown in the drawings and will be hereinafter described presently preferred embodiments with the understanding that the present disclosure is to be considered as an exemplification of the invention, and is not intended to limit the invention to the specific embodiments illustrated.

For the purposes of a clearer understanding of the matters discussed herein, certain terms used herein are, for convenience only, described below, along with a non-limiting, representative description of the meaning that may be attributable to such terms.

(1) Inside market price—The price level that lies between the highest price bid and the lowest ask price in a market for a trading vehicle. The inside market price may or may not be a valid tradable market price.

(2) Last trade price—the last traded price in a market for a trading vehicle.

(3) Central market point ("CMP")—A dynamic point that represents a defined midpoint of a market. This point can exist within or outside of a graphical user display area. The calculated central market price is centered on this point.

(4) Central market price—The central market price is the inside market price for a trading vehicle, or a value that can be derived by a combination of inside market price and one or more other variables, such as the last trade price, the best bid, the best offer, the average of a pre-determined number of last trade prices (such as the average of the last three trades), and the prior day settlement price.

(5) Convergence point ("CP")—A static point within a graphical user display area that may be established by a system user. Once established, the central market point will converge upon the convergence point during active trading of the trading vehicle. The convergence point can be positioned by action of the system user.

FIG. 1a shows generally an electronic exchange in which a mainframe computer 40 is in two-way electronic communication with one or more user workstations 42. Such communication may be through a client server 44 located at the trader's location, or elsewhere. The mainframe 40 stores, transmits, and receives data representing the trading of a financial vehicle, including prices, volumes, trader account and other information as is known in the art. The workstations 42 permit a trader, who may be located remote from the mainframe 40, to receive data concerning the trading vehicle and to execute orders for the trading of that vehicle, in the manner to be described. The mainframe 40 may also process data relating to the trading vehicle and pass that data to other computers or systems associated with the exchange on which the vehicle is traded and, in turn, may receive data from such exchanges and pass it on to workstations 42.

Figure 1B:
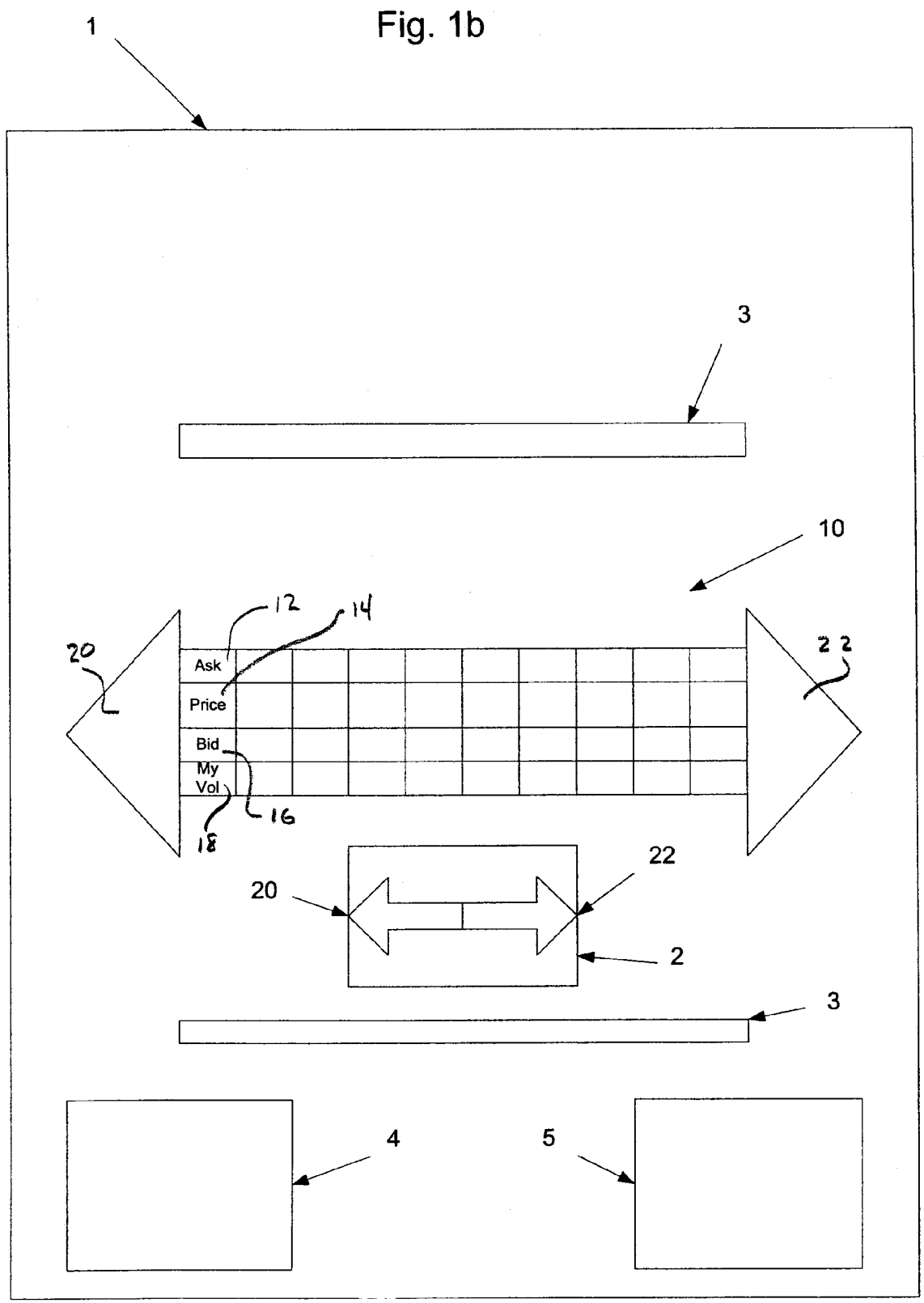
FIG. 1b shows a block diagram of a portion of a representative computer screen of a typical workstation with a graphical user interface having a market depth convergence tool according to one embodiment of the present invention together with areas of the screen having other interfaces and tools for the display of data to the user and for setting of various user-determined operating parameters.

FIG. 1b shows a representative computer screen 1 of a workstation 42 and a graphical user interface ("GUI"). The GUI permits a user to perform control operations by placing a mouse or keyboard cursor in defined areas and pressing a command button or key, such as a left or right mouse click, track wheel click, spacebar click, and the like. The GUI is provided with a market depth convergence tool 10 according to one embodiment of the present invention. The convergence tool 10 may include axes having an ask row (or column) 12, a price row (or column) 14, a bid row (or column) 16 and may advantageously include a "My Vol" row (or column) 18 for purposes hereinafter described. The convergence tool 10 also includes scroll buttons 20 and 22. The scroll buttons 20 and 22 may be included as part of the axes, as shown in FIG. 1, or may be included in other areas of the screen 1, such as that depicted generally at box 2.

As seen in FIG. 1c, price row 14 shows a range of prices for a trading vehicle, while the ask and bid rows show the market depth (i.e., the volume of outstanding bids or asks) for that vehicle at the respective prices shown in the price row. For instance, in the bid row 16, the number "47" indicates that there are 47 bid, or buy, contracts at the price of 100. Similarly, in the ask row 12, the number "96" indicates that there are 96 ask, or sell, contracts at the price of 101. As discussed in more detail below, the "My Vol" row 18 is used to show a numeric quantity that represents unfilled orders by a user at a particular price. The My Vol row 18 may be positioned as shown in FIGS. 1b and 1c as below the bid row 16 or above the ask row 12, or may also be included in another area of the screen 1, such as, for example, area 3 in FIG. 1b Advantageously, the precise location of the My Vol row 18 and the form that it takes may also be determined by the user upon the application of user control functions generally shown as box 4 in FIG. 1b. Such user control functions may also include the ability to adjust screen size, font, color, as well as the positioning and size of the convergence tool 10 and the My Vol row 18.

It will be appreciated that although FIG. 1b only shows a market depth convergence tool 10 and the items associated with boxes 2 and 4 and area 3, other features and functionality, can be added to the graphical user interface. For instance, other tools and graphics can be displayed to set trading parameters, such as the commodity being traded and default quantity values, or to show high and low prices, last traded prices, last traded quantity, net position, market volatility, etc. Also, a user may set text size and color attributes, column and row size, color and orientation. Moreover, myriad other buttons and settings (such as pull all buy/sell orders, forced convergence, order type selectors (i.e., limit, stop, stop limit, or immediate or cancel) can be displayed. These other displays/functionalities are generally represented by box 5 in FIG. 1b and are discussed in more detail below. Although FIG. 1b shows the control function boxes 4 and 5 to be spaced from the tool 10, one embodiment of the invention provides that they are included with or adjacent to the tool 10, and may also be included in a screen linked to tool 10 or as a drop down/up menu section.

In FIG. 1c, the price level that lies between the highest bid price (here, 100) and the lowest ask, or offer, price (here, 101) is the "inside market" price, which may or may not be a valid tradable market price. In a preferred embodiment, each of the ask, price, bid and "My Vol" rows or columns are given different colors so that a user of the convergence tool 10 can easily distinguish between each row. However, it will be appreciated that the present invention is not limited to differently colored rows (or columns) and that the present invention applies to any color scheme, including monochromatic color schemes. It will also appreciated that although horizontal and vertical orientations of market depth convergence tools are shown and described herein, the present invention is not limited to horizontal and vertical orientations. Indeed, any orientation or shape of the convergence tool 10 can be used in the practice of the present invention, including angular, curvilinear and circular orientations, among others.

The convergence tool 10 also includes a convergence point 24, which is a static point on the graphical display established by a user. As explained below, during the trading of the vehicle in question, the central market point will change as the bid and ask prices in the market change. Thus, the central market point will move along the price axes 14. When there is market volatility, this movement can result in a rather constant shifting of the central market point, left to right or right to left, in FIG. 1c. Consequently, a trader must continually focus and refocus on different portions of the screen during trading. As further explained in more detail below, once the convergence point 24 is established, the central market point moves toward the convergence point providing the advantage that the trader can quickly see the direction of the market while focusing on, a limited area of the screen. In other words, the price row 14 is dynamic and will adjust and move until the central market point becomes centered on the convergence point 24. It will be understood, however, that while a preferred embodiment of the present invention uses the inside market price as the central market point, it is within the scope of the present invention that the central market point can be defined in part by other variables in the market, such as the last traded price, opening price or closing price, but a preferred embodiment will have the inside market price as a component of the central market point.

Figure 16:
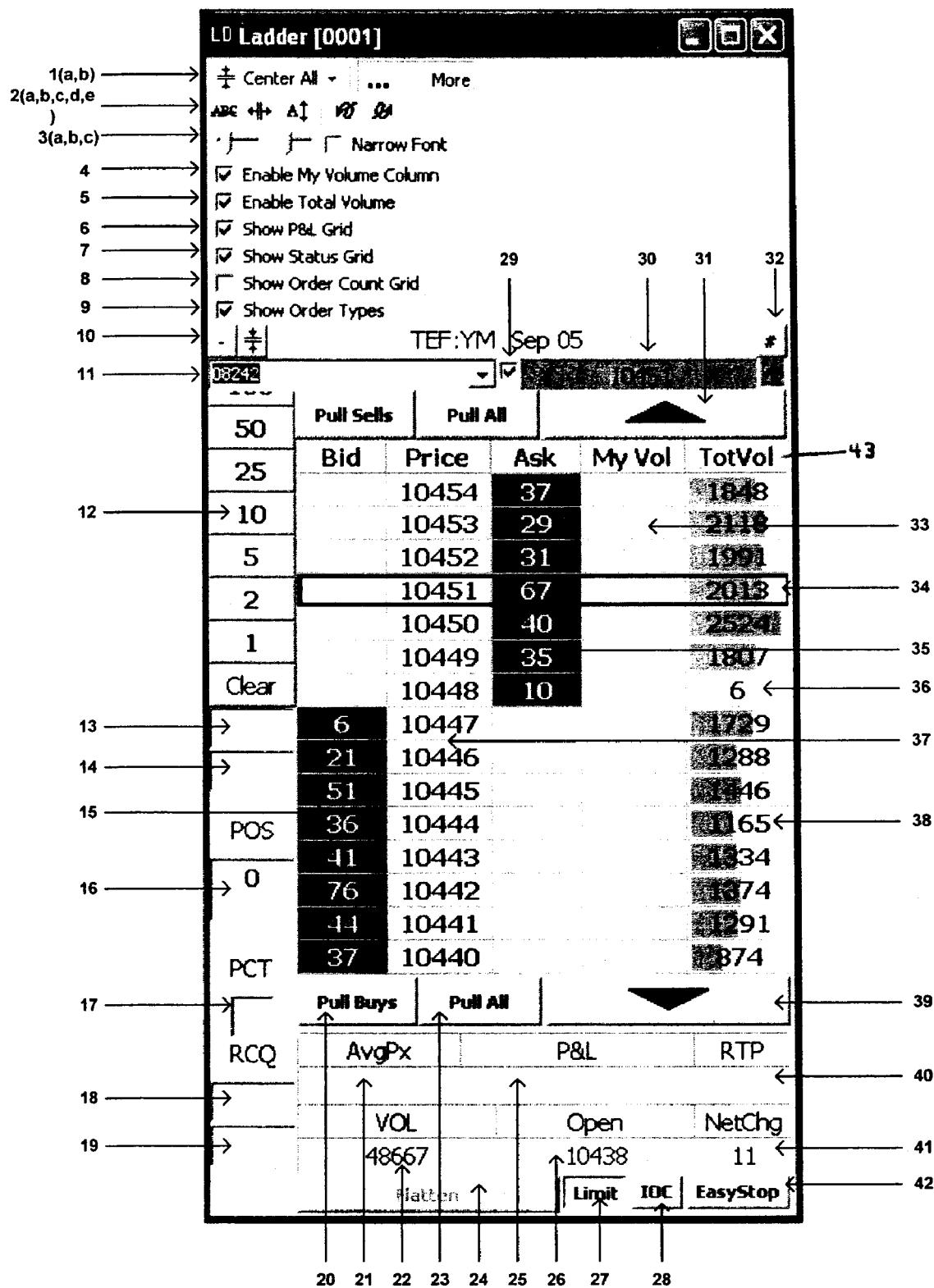
FIG. 16 shows one embodiment of the graphical user interface having the market depth convergence tool and associated user functionality.
Figure 17:
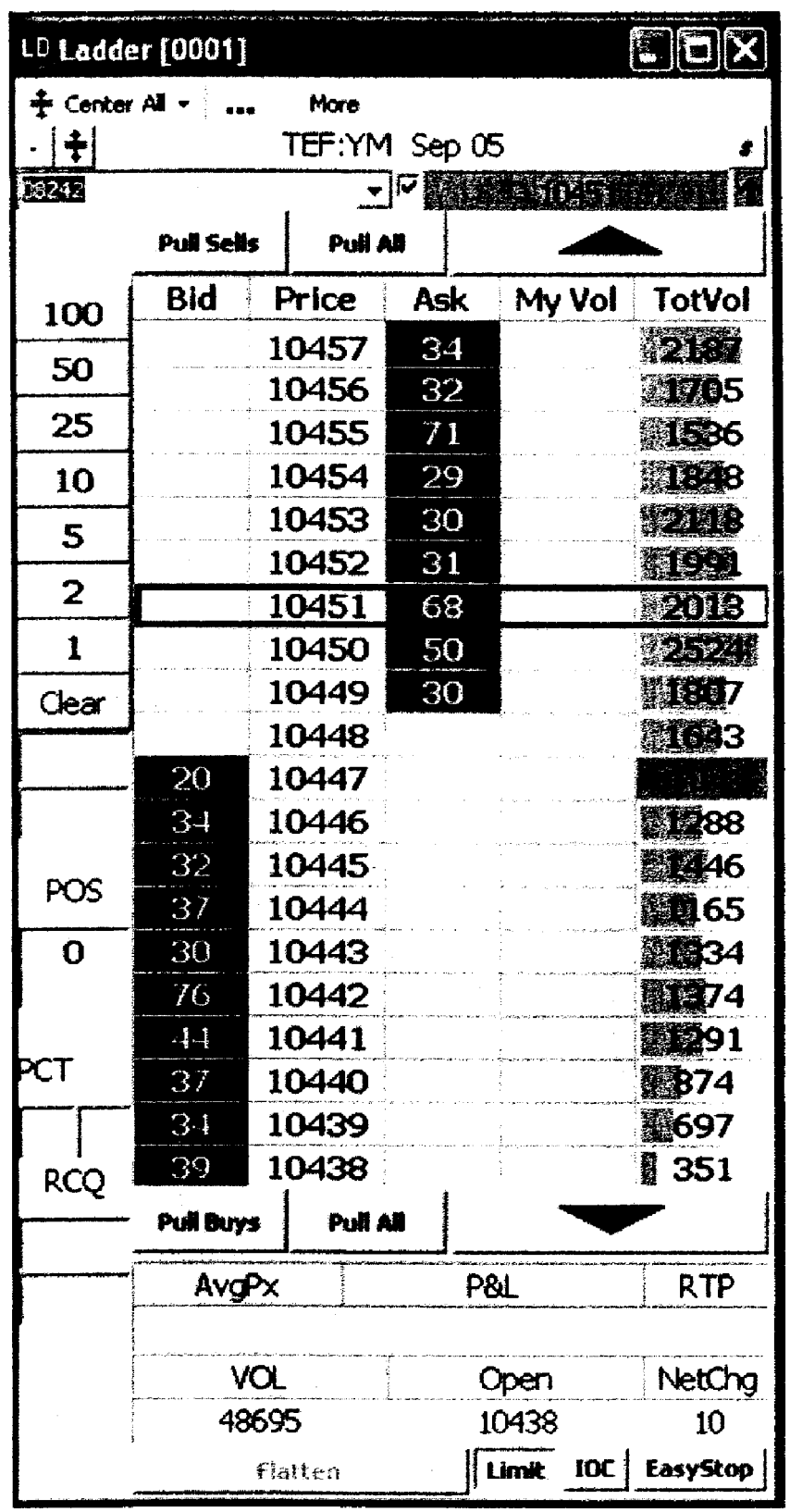
FIG. 17 shows the graphical user interface of FIG. 16 with certain user functionality hidden.

It should be appreciated that while FIGS. 1c, 1d, 2a-2c, 3a-3e, and 4a-4c depict the convergence point 24 as an arrow, that point may take on other visual forms, or may not be visible at all, as represented in FIGS. 16 and 17 discussed below.

The present disclosure thus describes a convergence tool that provides a graphical user display of bids and offers in a market and the ability to enter orders for trading anywhere along a continuum of prices. When the central market point changes, it will immediately begin to dynamically move towards a user defined convergence point within the graphical user display.

In a preferred embodiment of the invention, the central market point will begin moving towards the convergence point 24 whenever these two points become separated. This separation may occur in one of the following ways:

(1) There is a change in the bid, offer, or last trade price that results in a change in the central market point.

(2) The system user positions the central market point to another location on (or off) of the graphical display (as in scrolling market prices).

(3) The system user moves the convergence point to another location on the graphical interface.

The movement of the central market point is illustrated in FIGS. 1c and 1d, which depict a horizontal orientation of market prices, and corresponding bids/asks in the market representing market depth. In FIGS. 1c-1d, the convergence point 24 lies in the center of the horizontally oriented display.

FIG. 1c shows the central market point, or CMP, aligned with the convergence point, or CP, 24. In this instance, the central market point is the same as the inside market price (i.e., the price represented by the average highest bid price, here 100, and the lowest ask price, here 101, or 100.5).

FIG. 1d shows that the inside market price changed due to a change in the high bid/low offer prices. In other words, during active trading of the trading vehicle represented in FIGS. 1c and 1d, the bids and asks placed into the market caused a shift in the inside market price. Focusing solely on bids, FIG. 1c shows the highest bid price at 100, whereas FIG. 1d shows the highest bid price at 98. This trading caused the inside market to drop from 100.5 in FIG. 1c to 98.5 in FIG. 1d. Because of this change, the central market point is now not aligned with convergence point 24, and has moved to the position noted by arrow 26. Now separated, the central market point 26 then immediately begins to converge on the convergence point 24, as represented by arrow 27.

Such convergence causes the price axis data to move toward the convergence point 24. In addition, as the price axis data moves the respective bid and ask data for each price will adjust so that there is continual alignment of bid, ask and price information. In other words, the bid data (or volume) associated with the price, such as "98", will be aligned with that price irrespective of the actual location of the price "98", along the price axis 14. Of course, during normal trading, the bid volume will regularly change in amount.

FIGS. 2a-2c show a further representation of the movement of the central market point 26 toward the convergence point 24. In FIG. 2a, the inside market price had changed causing the central market point 26 to be offset from the convergence point 24. The central market point 26 then begins to move, as noted by arrow 27, toward the convergence point 24 until they are fully converged, as shown in FIG. 2c.

In FIGS. 2a-2c, a change in the inside market price resulted in a shift the central market point. However, the central market point may also be moved manually by the user. In the display shown in FIGS. 2a-2c, the trader can scroll prices to the left or the right by using the scrolling arrows, or buttons 20, 22. At the moment the trader stops the scrolling action, the central market point will immediately begin to move towards the convergence point 24. Although the scrolling arrows 20, 22 are shown in FIGS. 1c, 1d, and 2a-2c as being adjacent the respective ends of the price, ask and bid axes, those arrows 20, 22 can be located on other parts of the graphical user interface, as depicted by area 2 in FIG. 1b.

Figure 2:
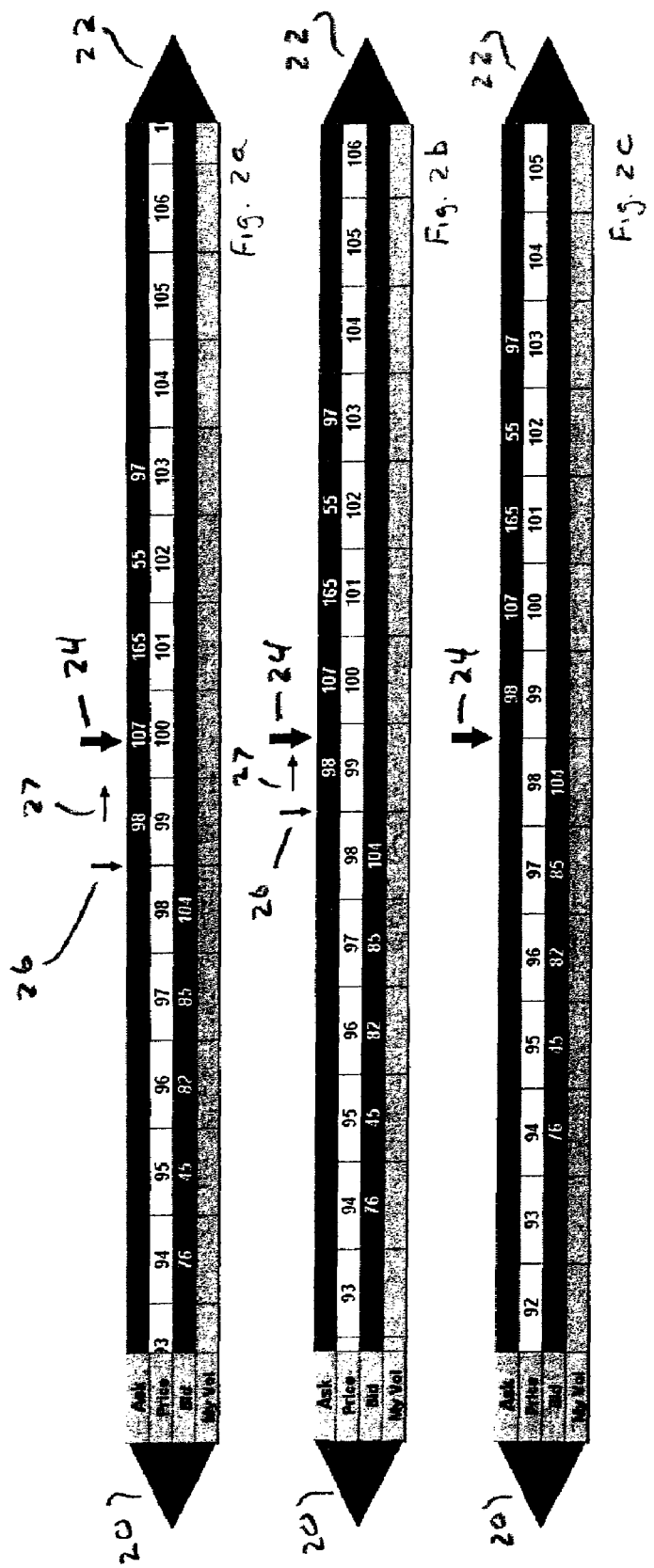
Figures 3A, 3B, 3C, 3D, 3E:
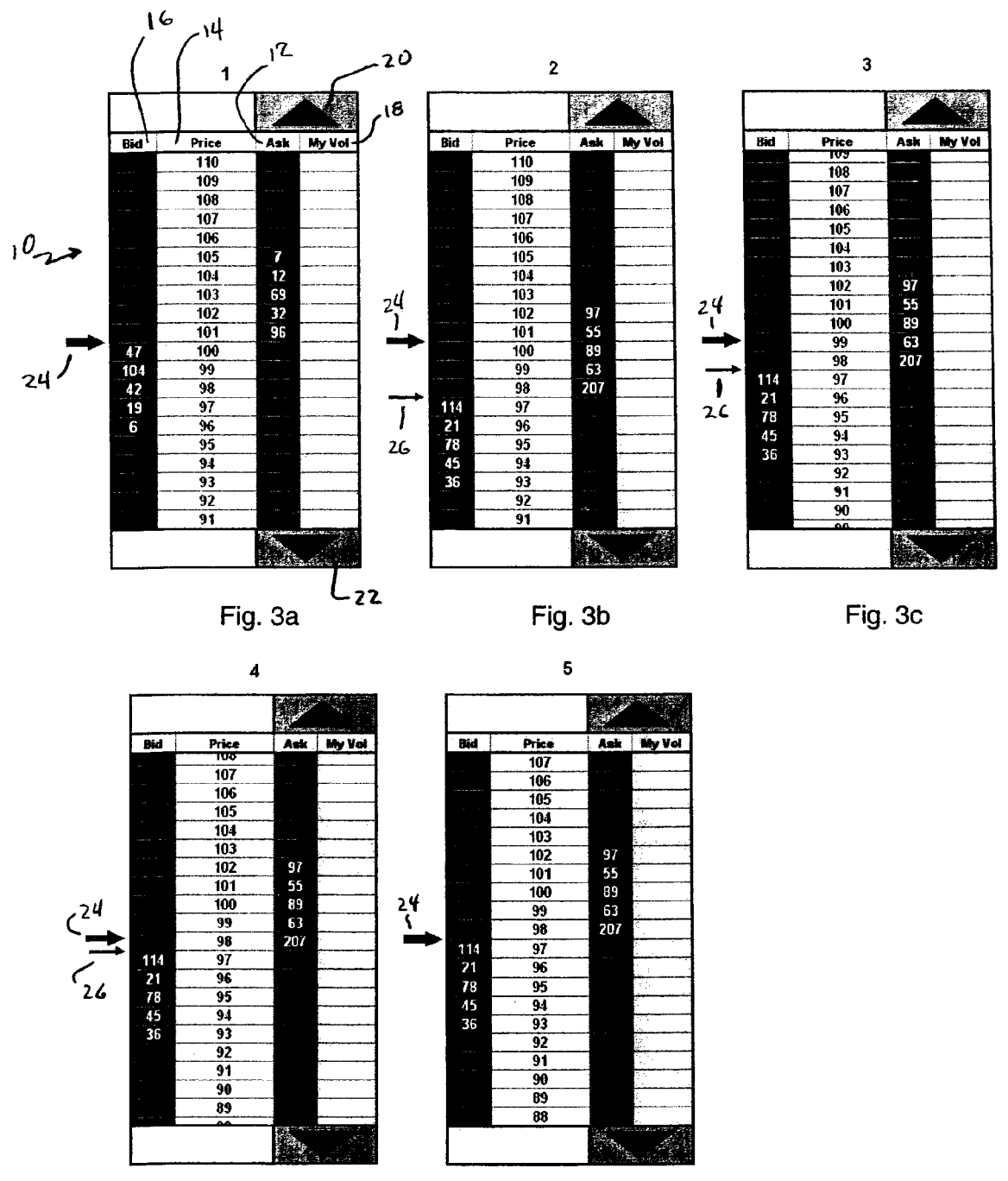

While FIGS. 1 and 2 show the market depth tool oriented in a horizontal fashion, the present invention provides for other orientations. For example, a vertical orientation of the market depth tool 10 is shown in FIGS. 3a-3e. FIG. 3a shows the bid, price, ask and My Vol axes presented vertically, with arrows 20 and 22. Arrow 20 may be set by the user to scroll prices from the bottom of the tool toward the top thereof, with arrow 22 operating in the reverse fashion. Alternatively, user preference might desire to have arrow 20 operate to scroll prices from top of the tool 10 toward the bottom and have arrow 22 operate in reverse. The functionality controls of the tool 10 permit either action.

In FIG. 3a, the central market point is aligned with the convergence point 24. FIG. 3b shows the result of a downward movement in the central market point 26 following a change of the inside market price (in this instance the inside market price decreased from 100.5 to 97.5). FIGS. 3c and 3d show a gradual movement of the central market point, noted by arrow 26, back to the convergence point 24 until they are aligned, as in FIG. 3e.

As noted, FIGS. 1*d*, 2*a*-2*b*, and 3*b*-3*d* depict the central market point by arrow 26. When the market depth tool of the present invention is employed while trading vehicles, a user may adjust the visual appearance of the arrow 26 to some other character, such as a line, a dot, triangle, square, or other symbol, or may opt not to display the symbol at all. However, when a symbol representing the central market point is displayed, a user can readily see the relative current market condition and activity by noting the distance the symbol, or arrow, 26 is from the convergence point 24.

FIGS. 2 and 3 show a convergence event that was prompted by a revaluation of the central market point due to a change in the inside market price. As noted, a system user can also manually move the central market point to another location within the display axes. For example, a trader may scroll prices to place an order at a price level not currently found in the viewable area. Alternatively, a trader may want to view a working order from the "My Vol" column that has moved out of the current viewable price range.

Figures 4A, 4B, 4C:
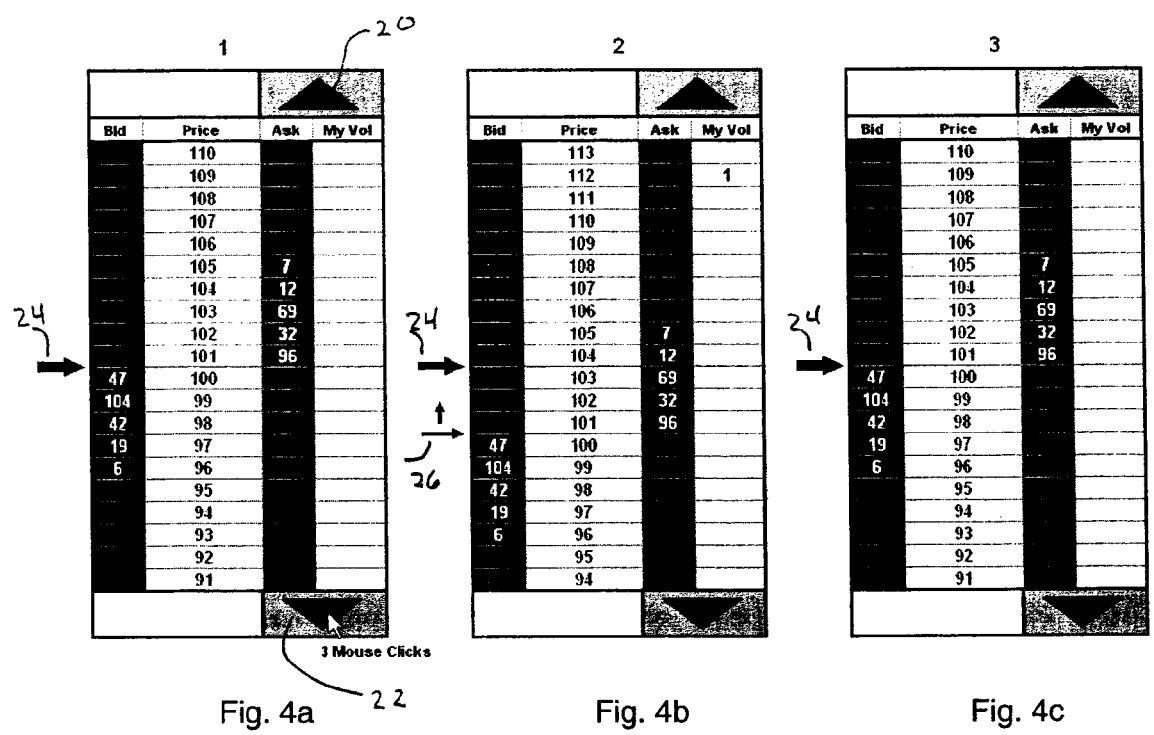
FIGS. 4a-4c show a progression of movement of the central market price to the convergence point in the graphical user interface of FIG. 3a, as initiated by the user.

FIGS. 4*a*-*c* depict a manual move in the central market point prompted by clicking the scroll arrow 22 three times. Such action results in a corresponding downward shift of the price and corresponding bid, ask, and My Vol columns by a unit of three full horizontal rows which reveals, in the My Vol column, an order placed by the trader to sell one instrument above the then market at a price of 112 (FIG. 4*b*). In such a manual move, the location of the convergence point 24 remains unchanged. When the trader stops clicking the scroll arrow 22, the central market point 26 then begins to converge upon the convergence point 24 until they are in alignment, as depicted in FIG. 4*c*. Although FIG. 4*a* shows the downward movement of the price column by clicking arrow 22, it should be appreciated that such movement could also occur by clicking arrow 20, in which case arrow 20 would effect a downward movement of prices and arrow 22 would effect an upward movement of prices.

Central Market Price Calculation

In one preferred embodiment, the central market price is the inside market price, which is determined by averaging the highest current market bid and lowest current market offer (or ask) for the vehicle being traded:

(Highest Current Bid+Lowest Current Offer)/2

Alternatively, in another preferred embodiment, the central market price may be set by the trader to another value such as, for example, a value based on one of the last trade price, the best bid price, or the best ask price.

Although use of one of the foregoing values to establish the central market price when that price is not based solely on the inside market price is currently a preferred implementation of the present invention, the setting of the central market price can also use other factors, including user preference, the market mode (close, pre-open, open), and market conditions. For example, when the market mode is open, it is preferred to include the inside market price as at least one parameter in the calculation of the central market price. If the market mode is closed or pre-open, there are no current bids and offers on which to determine the central market price. When the market mode is closed, there are no current bids and offers on which to determine the central market price. In this situation, the determination of the central market price could thus include the last traded price, the exchange settlement price, the average traded price for the last trading day or a portion thereof, or an average of the best bid/offer at the last market close. All of these factors form a part of the present invention.

When the market mode is "Pre-Open", bids and offers can be entered anywhere in the bid/ask columns along the price continuum. Bids that exceed offers (and vice-versa) will not be executed until the market opens. Thus, during pre-open, market bids can exceed market offers. During this time, a trader may choose alternative methods of establishing the central market point including previous exchange settlement price, market opening guess (i.e., at what price would the market open if it were to open with current bids and offers as they are found in the market depth, etc.). During this time the trader may also choose to select an arbitrary central market price based on his view of where he believes the market will actually open.

Finally, a trader may want to bias the calculated central market price based upon some other value. For markets that are very illiquid, the lowest bid and highest offer can be multiple price levels apart. If the highest volume of trades is occurring closer to the bid price than the offer price, the trader might decide to bias the calculated central market price to be closer to the bids than the offers. This would give a visual cue to the trader that the actual market clearing rate (i.e., the price where buyers and sellers are actually trading) is somewhere closer to the current bid than the current offer. This may be accomplished by incorporating the last trade price into the central market price calculation. The following provides an example of establishing a biased calculated central market price, using the formulae:

Inside market price=(Highest Current Bid+Lowest Current Offer)/2

Central market price=(0.5*Inside Market Price)+(0.5* (Average of Last two trade prices))

For example, assume a highest current bid=95, a lowest current offer=105, and last two trade prices were 103, 104.

Applying these values to the foregoing formulae yields:
Inside market price=(95+105)/2=100
Average of last 2 trade prices=(103+104)/2=103.5
Central market price=(0.5*100)+(0.5*103.5)=101.75

Thus the central market price would be set at 101.75 on the market depth tool.

Convergence Speed

As noted, one advantageous aspect of the present invention permits the speed of convergence of the central market point 26 on the convergence point 24 to be controlled by a user of the system. The control of the speed of convergence will now be described.

As is well known, speed is the distance traveled over a given period of time. On a computer screen, the minimum unit of distance moved that can be displayed is a single pixel. The actual length and width of a pixel on a computer screen depends on the screen resolution, both horizontal and vertical, and the actual size of the viewable portion of the monitor. For purposes of the following speed calculations, it is assumed that the minimum distance is a single pixel. Using a single pixel as the minimum unit of change in a market depth/price display helps to smooth out the convergence of the central market point on the convergence point so that the convergence movement can be more easily followed by the trader. The actual linear distance for a particular user will vary based on the actual screen resolution and the monitor surface screen size. Moreover although a single pixel move is described, it should be appreciated that such a move could also cover a price level (i.e., a move from one displayed price to another adjacent price level or cell). All such approaches form a part of the present invention.

Certain existing prior art systems lock the numbers that represent prices and/or market depth into a preset static grid of cells. Thus, all changes in prices or market depth are reflected by a change in the value displayed within the static underlying grid. This convention for displaying changes in the market creates problems when the display is used as a trading interface. An instantaneous change in a price on this grid that occurs simultaneously with a click to submit to or withdraw an order from the market may result in an unwanted execution at an undesired price.

According to the presently preferred embodiments of the invention disclosed herein, a gradual shift in the underlying price axis will provide the trader with the ability to react to price changes at a rate that can be readily discerned while automatically moving the inside market price, or the central market point, to a desired location within the user's field of view.

The present invention provides a variety of methods for establishing the speed at which the central market point 26 converges on the convergence point 24 set by the user. Each approach is designed to smooth the convergence at a rate which is intuitive and easy for the trader to follow. The velocity at which the central market point 26 moves towards the convergence point 24 when the two are separated can be set by the system user in one of the following preferred ways:

(1) Constant rate—The constant rate of convergence results in a convergence at a constant speed along the price axis and may be adjusted as a parameter by the system user. Using this method, the user sets a single delay parameter, D, which corresponds to a delay interval that is defined as a pre-determined number of milliseconds between each move, thus establishing the length of time between each pixel, or price level, move while the CMP converges on the CP. Thus, D=the delay interval parameter in milliseconds between each pixel or price level move, as set by the system user.

(2) Variable rate by varying the number of pixels, or price levels, moved per unit of time—This variable rate provides a non-linear rate of convergence that varies depending on the distance between the central market point 26 and the convergence point 24. With this approach, the velocity of the central market point varies by the magnitude of distance between it and the convergence point with longer distances resulting initially in a faster convergence speed. Although there are a number of ways to implement a variable rate convergence, the presently preferred embodiment allows the user to select a parameter "D" which represents the number of milliseconds of delay between the iterations of each convergence movement, similar to that described above with respect to the constant rate of convergence. However, the number of pixels of convergence traversed per move iteration varies depending upon the distance between the CMP and the CP on the graphical interface. As the CMP and CP become farther apart, the number of pixels the CMP moves across (or down) per unit of time increases. Conversely, the number of pixels the CMP moves across (or down) per unit of time decreases as the CMP and CP get closer together. An example of the parameters and a description of the process flow useful in the variable rate convergence is given below:

Parameters

D=Delay parameter in milliseconds between each iteration of convergence, as set by the system user.

P0=Price level on the trading GUI that corresponds to the location of the CP

P1=Price level on the trading GUI that corresponds to the location of the CMP

T=Difference in price levels between P0 and P1 (T=P0−P1), where T represents the price level distance between P0 and P1.

Process Flow

Figure 5:
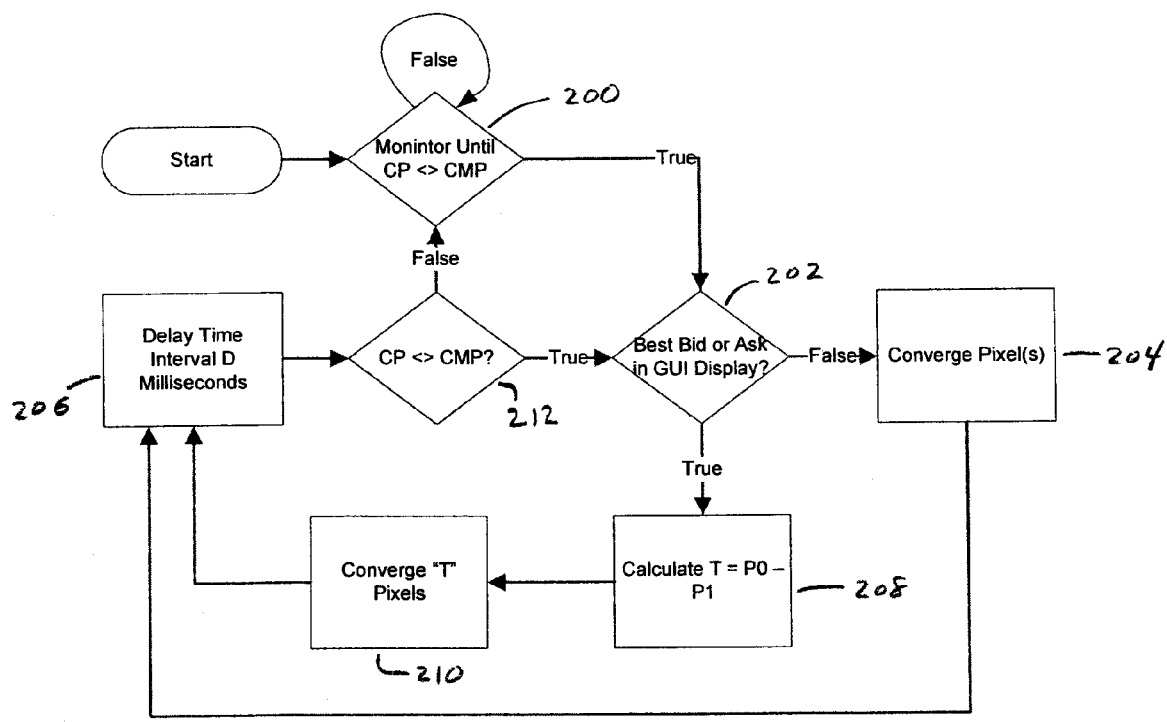

A function is called when the CP<>CMP (i.e., the location or value of the convergence point differs from the location or value of the central market point) This difference may occur when the user scrolls prices or changes the location of convergence point or the central market price itself changes. When called, the function performs the following actions, as depicted in FIG. 5.

Figure 10:
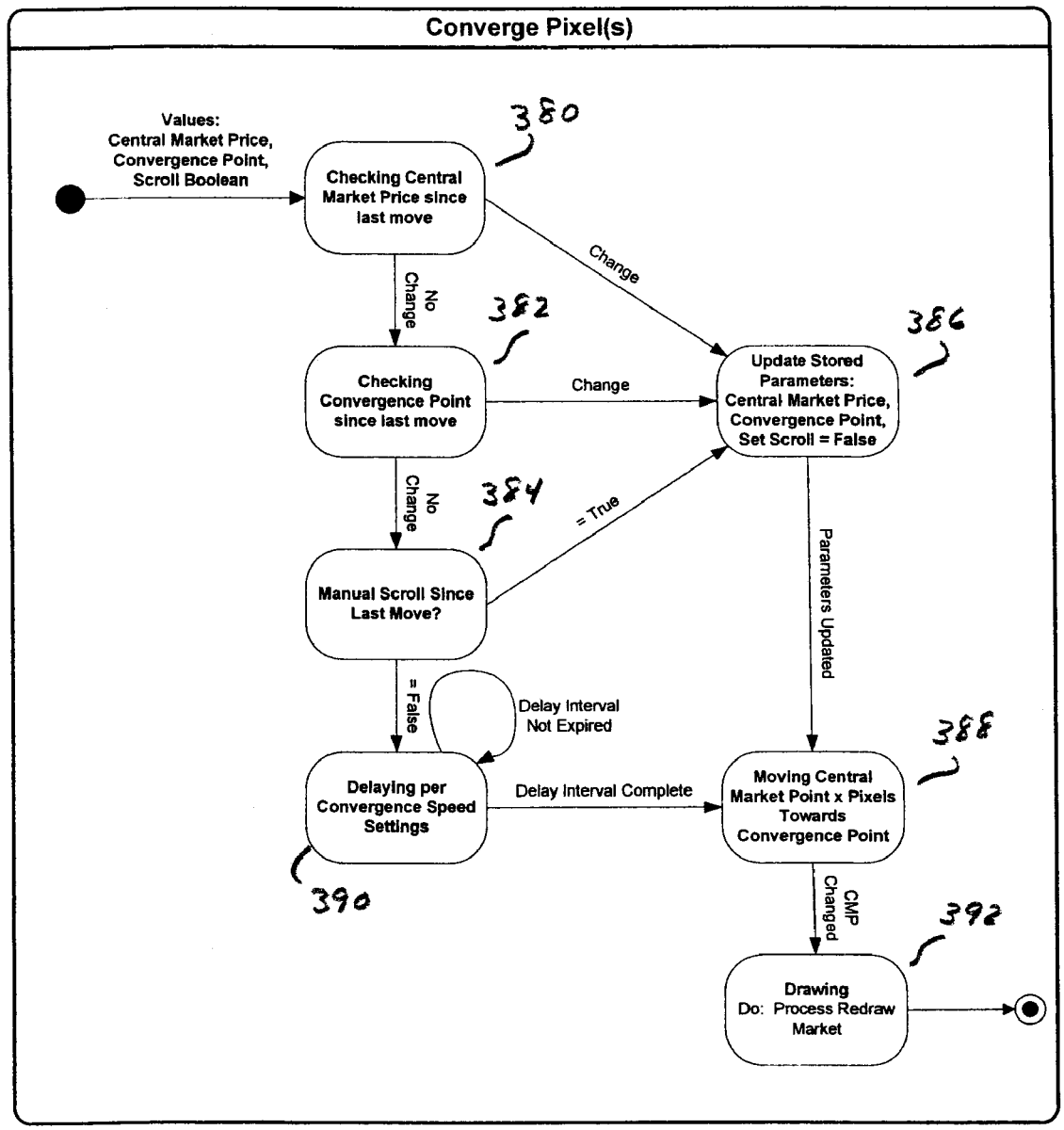

Assuming the user has selected the variable rate convergence function, the function starts when the CP<>CMP (i.e., those two values are unequal), as at step 200. At that time, the system determines, at step 202, if the best bid or the best ask price (i.e., the highest current bid or the lowest current ask) are currently displayed in the viewable area of the GUI of the market depth trading tool. If the best bid or best ask are not displayed, the system defaults, at step 204, to a one pixel, or price level, convergence move based on the delay time interval 206, thereby providing a slow convergence rate. The process followed at this step is shown in FIG. 10. The CP and CMP values are then compared at step 212 and, if they are unequal, steps 202, 204, 206 and 212 repeat until either the best bid or best ask are displayed on the GUI, as confirmed at step 202 or until the CP is equal to the CMP as confirmed at step 212, at which time monitoring step 200 is entered.

If step 202 confirms that either the best bid or best ask are then displayed on the GUI, the system, at step 208, calculates T, from above. As noted, T represents the number of price levels between the CP and the CMP at the time of the calculation. Once the distance T is determined, the system at step 210 then converges the CMP to the CP, based upon the delay time interval D. For example, if the distance T is 30 price levels and the delay time D is 25 milliseconds between each iterative move, the system can advantageously cause the CMP to move 10 levels in the first 25 milliseconds, 8 levels in the second 25 millisecond period, 6 levels in the third period, 4 levels in the fourth period, and 2 levels in the fifth 25 millisecond period. Thus, after 125 milliseconds, the CMP would have moved 30 price levels and be aligned with the CP but the speed of such alignment varies over the distance traveled. This is contrasted to the constant rate of convergence, discussed above, where under these circumstances, at total of 750 milliseconds would be required to move the 30 price levels at a constant 25 millisecond delay.

At the conclusion of the convergence process, step 212 again compares the CP and CMP values. If they are equal, the system defaults to monitoring step 200; if they are unequal, for example, due to a change in the central market price during convergence, then step 202 is entered and the process repeats.

(3) Variable rate by time interval—The variable rate by time interval convergence method is similar to the non-linear rate of convergence method described above, and is a preferred method in the disclosed invention. However, in this method the delay interval between successive moves will decrease as the CP and CMP get farther apart and increase as they get closer together. The convergence distance per delay interval is fixed at 1 pixel or price level; this also differs from the non-linear rate method where the delay interval was held constant but the convergence distance per delay iteration varied by distance. A description of the parameters and the process used in this variable rate by time interval convergence method are:

Parameters

D=The delay in milliseconds as set by the system user

DA=Delay Interval Adjustment as set by the user and is preferably a fraction of the slowest delay, D, in milliseconds and most preferably is on the order of $\frac{1}{10}^{th}$ of D DMin=Minimum Delay Interval as set by the user DUsed=Delay Interval to use for this iteration, where DUsed is less than or equal to the greater of DMin or the result of the calculation of the formula: D−(T×DA)

P0=Price level on the trading GUI that corresponds to the location of the CP

P1=Price level on the trading GUI that corresponds to the location of the CMP

T=Difference in price levels between P0 and P1 (T=P0−P1)

Process Flow

Figure 6:
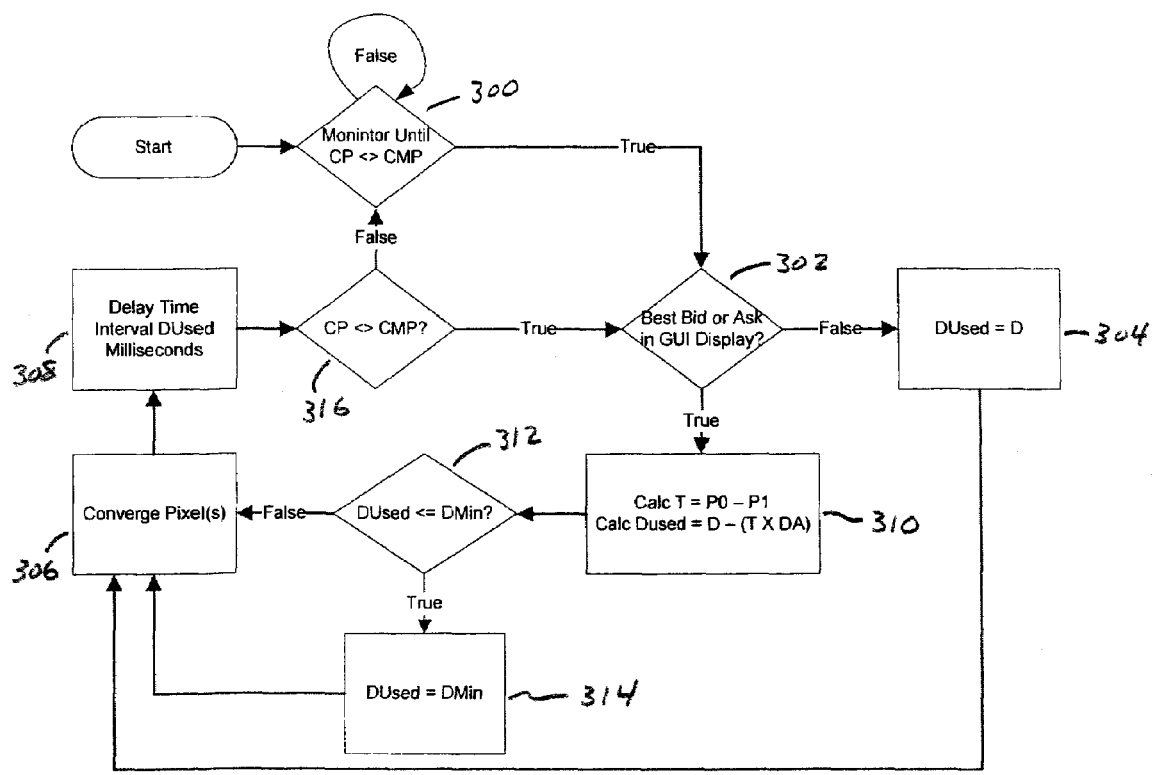

FIG. 6 depicts this convergence method. A function is called when the CP<>CMP (i.e., the central market point does not equal the convergence point because the central market price has changed, the user has scrolled prices, or the user has changed the location of convergence point). At step 300, the values of the CP and the CMP are thus monitored until such time as they are unequal. At that point, step 302 determines if the best bid or best ask (i.e., the highest current bid or the lowest current ask) price are displayed in the viewable area of the GUI. If either the best bid or best ask price is displayed, step 310 is taken, in which the value T is calculated and DUsed is calculated with the results passed to step 312. In step 312, the value of DUsed is compared to DMin and if DUsed is not less than or equal to DMin, step 306 is taken and a one pixel, or price level, converge is instituted at step 306 and continues based on the step 308 DUsed delay time interval. The process followed at step 306 is shown in FIG. 10. At step 312, if DUsed is less than or equal to DMin, then step 314 proceeds and DUsed is set equal to DMin, after which steps 306 and 308 are taken. In this instance, the movement may be one pixel or, preferably, one price level.

Returning to step 302, if the step establishes that the best bid or best ask price is not displayed on the GUI, then step 304 sets DUsed equal to D, following which steps 306 and 308 are taken.

At the conclusion of step 308, step 316 is taken which compares the value of the CP to that of the CMP; if those values are equal, convergence has occurred and the system returns to step 300 for monitoring. However, if the values are unequal, step 302 is entered and the process is repeated.

In this process, the user may set the delay interval between each convergence move and may also set a delay interval adjustment, the result being that the delay between each convergence step will be less as the CP and the CMP are farther apart and will become greater as they converge. Preferably DMin is the minimum delay interval available t the user. An example of this process follows, where it is assumed that:

D=250 milliseconds
DA=25 milliseconds
DMin=25 milliseconds
T=10 price levels

In the first iteration of the convergence move, DUsed is calculated in step 316 as:

DUsed=D−(T×DA)
DUsed=250−(10×25)
DUsed=0 milliseconds

Because DUsed is calculated to be less than DMin, at step 314 DUsed is set equal to DMin and the first convergence step uses DMin as the delay time in step 318. Thereafter, steps 316 and 302 are taken and DUsed is recalculated at step 310, as:

DUsed=250−(9×25), where T is now =9
DUsed=250−225
DUsed=25 milliseconds

Here, DUsed is equal to DMin and accordingly step 314 is taken and the delay interval for the second convergence move iterations is set to DMin, or 25 milliseconds. Steps 316 and 302 are again taken and DUsed is recalculated for the third iterative convergence movement. The calculation is:

DUsed=250−(8×25), where T is now =8
DUsed=250−200
DUsed=50 milliseconds

In this situation, step 312 establishes that DUsed is not less than or equal to DMin, so step 306 is taken and the delay for the third iterative convergence movement is the calculated DUsed value of 50 milliseconds. As will be seen, as the distance between the CP and the CMP decreases, i.e., the number of price levels between the two become less, the delay between each iterative move, hence the speed of convergence, increases. This is seen in the following table:

| T, Price Level Difference | DUsed, Delay Interval Convergence, Milliseconds |
|---|---|
| 10 | 25 |
| 9 | 25 |
| 8 | 50 |
| 7 | 75 |
| 6 | 100 |
| 5 | 125 |
| 4 | 150 |
| 3 | 175 |
| 2 | 200 |
| 1 | 250 |

(4) Converge by rows—The convergence by rows method uses a constant rate of convergence which can be adjusted as a parameter by the system user. However, instead of converging a single pixel per iteration (as with the constant rate method described above), the CP and CMP will converge by the height (or width) of a single price cell (in a column or row) in the displayed continuum of prices. Using this method, the user sets a single delay interval parameter. This parameter corresponds to a delay interval that is defined as a set number of milliseconds and controls the length of time between each row (or column) move while the CMP and CP are converging. For example, with a delay time of 25 milliseconds and if the CP and CMP are two price levels apart, then the convergence would require two iterations, for a total of 50 milliseconds.

(5) Auto converge—In the autoconverge method, the CP defines a central point on the price continuum and the CMP is fixed constant at this level. Convergence upon the CP is instantaneous with any given change in the CMP.

Convergence Process Mechanics

The market depth tool of the preferred embodiments of the present invention represents an advanced trading tool that preferably offers the advantages of automatically centering the central market point, hence the central market price, upon a specified point within a graphical user interface display area with such convergence occurring in a smooth motion. A characteristic of this tool is that whenever the central market price moves away from the convergence point on the screen, the central market price and corresponding market price levels in the display will immediately begin to move back towards this defined point. The inside market is thus either completely aligned with this convergence point, or it is moving towards it. The following will describe the operation and function of this convergence.

Figure 7:
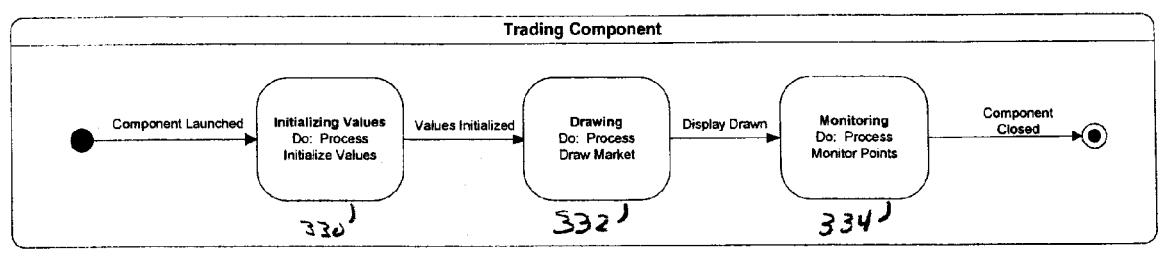

FIG. 7 shows a high level flow diagram of what occurs between the time that the market tool is launched and the time that the trading session is terminated. When the tool, or component, is first launched for a particular financial instrument, the parameters needed to build the GUI are loaded and initialized, at step 330, including relevant market data from mainframe 40 and configurable parameters from the system settings such as may be obtained from client server 44. Once these parameters are loaded, step 332 processes the market data and loads it into the market depth tool on workstation 42. The system then receives continuous market data, including ask and bid prices and volumes, among other things, from mainframe 40 and will dynamically update the tool, at 334, as the market changes.

Monitoring Process

The system of the present invention includes processes to constantly and dynamically monitor the underlying market for the trading vehicle for events that would cause a separation of the central market point 26 from the convergence point 24. These events include: (i) a change to the inside market price change, (ii) a scroll of prices by the user, or (iii) a change of the convergence point by the user. Any of these events results in a change in value of either the central market price or the convergence point.

The monitoring process included in the present invention identifies when the central market point (CMP) and convergence point (CP) are out of alignment. This is depicted in FIG. 8.

Figure 8:
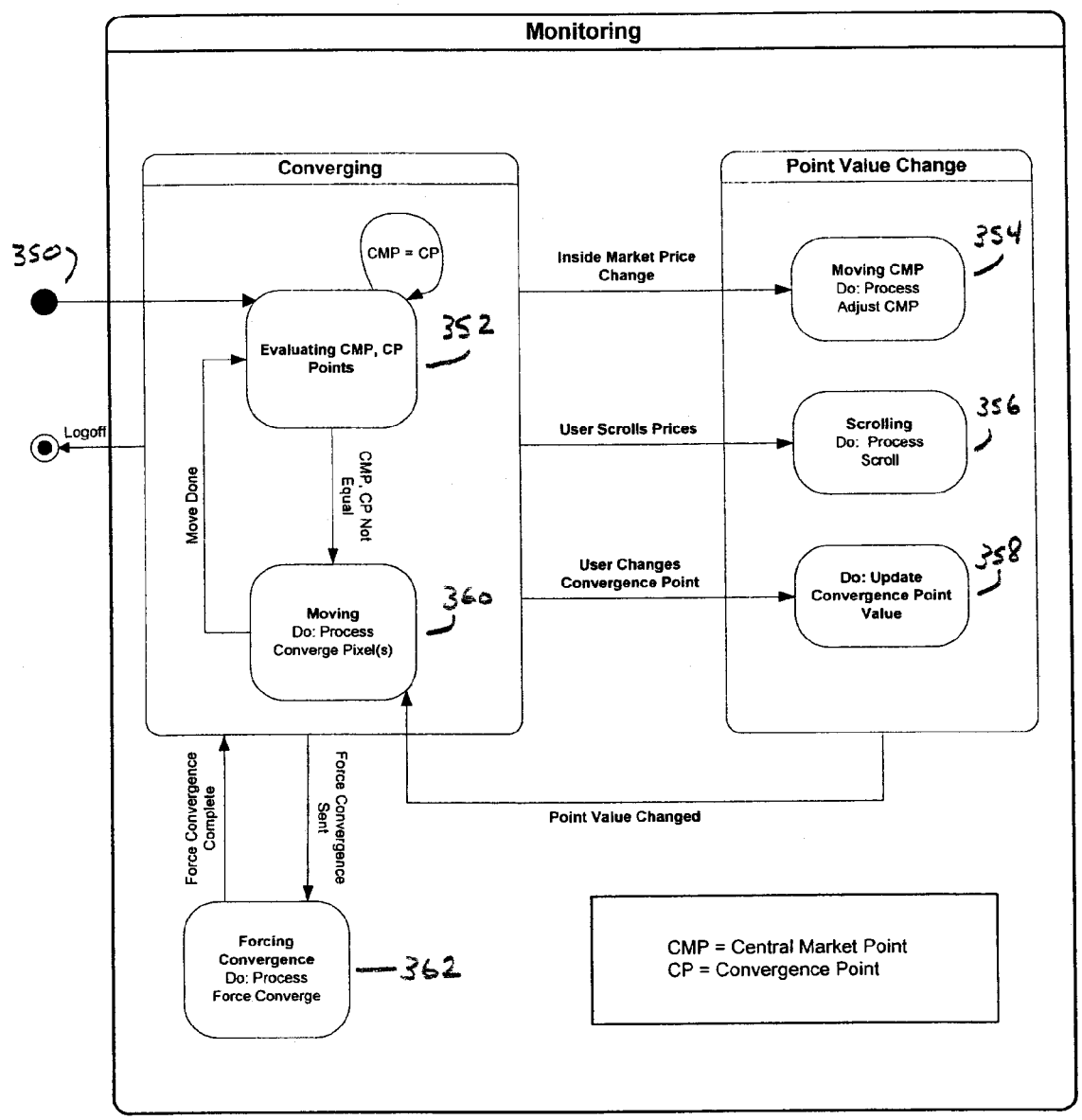

FIG. 8 shows the representative flow of the monitoring process of step 334 of FIG. 7. Upon system log-on at 350, and after the initialization and data processing steps 330, 332, the system evaluates the values of the CMP and the CP in step 352 to determine if they are equal or not and will institute a convergence routine if they are unequal.

For example, if the difference is caused by a change in the inside market price, the monitoring function will transfer to the Adjust CMP process, as at 354. If the difference is due to the user scrolling the price axis, then the Process Scroll function 356 will proceed. Likewise, if the difference is due to the user changing the position of the convergence point 24, then the Update Convergence Point routine 358 is performed.

The results of these three routines will be a point value change that will then cause the converge pixel(s) 360 step to be taken. The monitoring will continue to loop through this process until the central market point 26 moves back to the convergence point 24 in the display. The convergence motion is smoothed by a delaying each pixel motion by a set or calculated number of milliseconds; however, there is preferably no delay on the first pass through the "converge pixel(s)" process immediately following any of the three defined trigger events described above.

The gradual convergence is ongoing as long as the CMP and CP are separated. Alternatively, a user can force an instantaneous convergence by clicking in a pre-defined region in the graphical interface and triggering the "Force Convergence" process step 362.

Convergence Trigger Processes

Figure 9A:
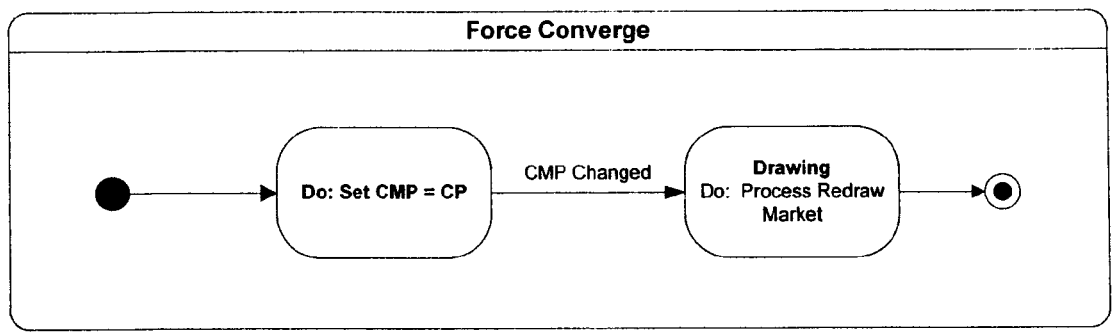
FIG. 9a shows a flow diagram of the force converge process of the trading system of one embodiment of the present invention.

As seen in FIG. 8, the overall monitoring process includes a number of sub-processes. The Force Convergence process 362 forces an instantaneous convergence of the central market point and the convergence point, as described above with respect to the auto converge method. This can be triggered by the system user clicking in a defined region in the graphical interface and is represented in FIG. 9a, where the CMP changed from its current value and is set equal to the CP. The system then redisplays the market depth tool, with the CMP and CP in forced alignment.

Figure 9B:
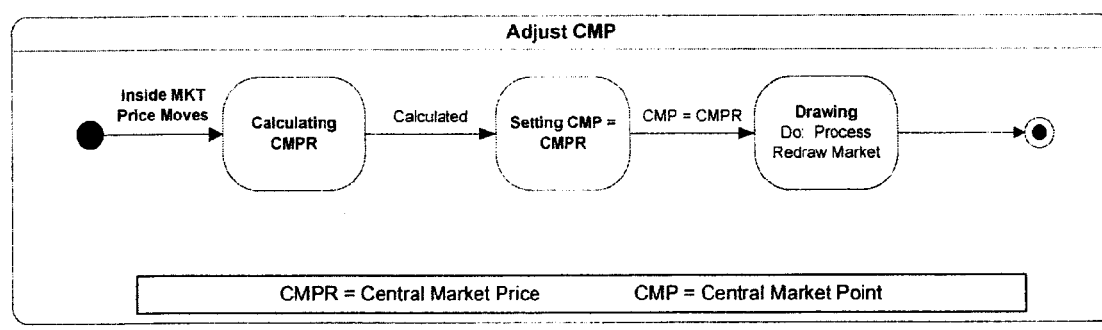
FIG. 9b shows a flow diagram of the adjust CMP process of the trading system of one embodiment of the present invention.
Figure 9C:
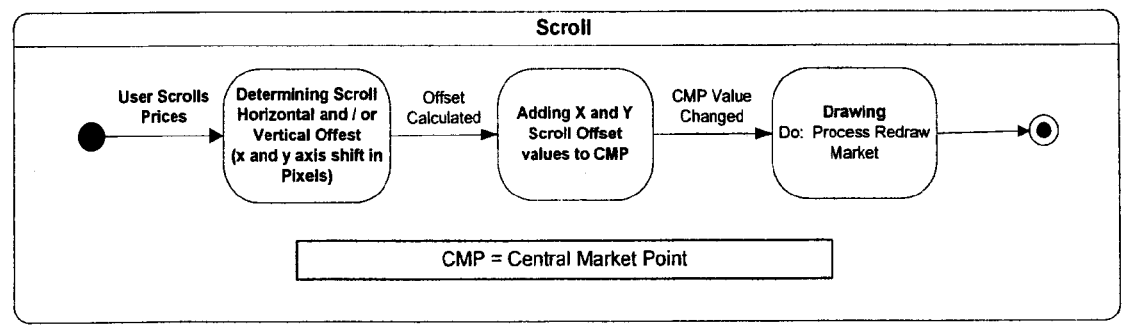
FIG. 9c shows a flow diagram of the scroll process of the trading system of one embodiment of the present invention.

The other two processes are triggered by a change in the central market, price either by a change in the inside market price (FIG. 9b) or a scrolling of prices by the user (FIG. 9c).

FIG. 9b shows the Adjust CMP routine 354 depicted in FIG. 8. When this routine is called, the central market price is calculated and the CMP is set equal to the calculated central market price. The display is refreshed showing the new location for the CMP, after which the convergence of the CMP to the CP commences using one of the convergence routines described above.

FIG. 9c shows the Scroll process routine 356, also depicted in FIG. 8. When a user scrolls the price axis horizontally or vertically an offset in the prices from the CP location, preferably determined in the x and y axis direction by number of pixels, is calculated. This offset is then combined with the x and y location of the CMP to establish a corresponding new location for the CMP, given the offset. The screen is then refreshed to show the new location of the CMP along the price axis and convergence proceeds.

Converge Pixel(s) Process Described

The monitoring process discussed above and depicted in FIGS. 8 and 9 identifies when the central market point and convergence point are unequal. When this condition is identified (CMP and CP not equal) the process "converge pixel(s)" shown in FIG. 10 is commenced. The monitoring process will continue to loop through the "Converge Pixel(s)" process until the central market point and convergence point are equal and in alignment on the graphical display.

The converge pixel(s) process performs the calculations that govern the speed of the actual convergence of the CP and CMP, managing the rate of change in the central market point. In one preferred embodiment of this process, any change in the inside market price will result in an immediate change in the CMP, followed by an immediate but gradual convergence of this point back to the CP. These convergence movements happen in rapid succession—the timing of each movement governed by the calculated delay interval and the nature of the convergence routine adopted by the use, as discussed above in the section headed Convergence Speed. Thus, from a user perspective, it appears as a smooth and fluid movement of prices to a central point of focus where the inside market price converges with the CP.

When the converge pixel(s) process is first triggered, it checks to see if any events have occurred since the last iteration of the converge pixel(s) process that would interrupt the delay interval. First, the process determines, at step 380 whether there was a change in the central market price since the last time the converge pixel(s) process was run. If there was no change, the process determines, at step 382, whether the CP was manually moved. If there was no such change, the process then determines whether there had been a manual scroll of prices at step 384. The process thus monitors, since its last run, for a change in any one or more of the central market price, the convergence point, and the issuance of a scroll command.

These conditions are checked by comparing current parameter values which are passed into the process each time it is run against stored reference values. If any of these three conditions is true (i.e., a change occurred since the last time the process was, run). then the updated reference values for the changed parameter are stored at step 386 and the delay interval for this pixel(s) movement is skipped. Skipping the delay interval upon a change in one of these three conditions ensures that dynamic change in the orientation of the central market price and the convergence point results in an immediate movement of prices towards the convergence point at step 388.

Once the central market point 26 is moved, a "redraw market" process, at step 392 is called to render the movement on the graphical display. In turn, the redraw market process 392 calls the convergence routine selected by the user, as described above, so that convergence occurs at a constant, variable or automatic rate. Following the movement, the points are evaluated again by the monitoring process which will continue to loop through the converge pixel(s) process until the CMP and CP are equal and in alignment on the graphical display.

On the other hand, if none of these three parameters changed since the last time the process was run, step 390 is taken and the delay interval is activated, following which the redraw market routine 392 is completed.

Convergence Control Settings

The optimal speed and method of convergence will vary by user preference. Factors that could influence user preference include, among other things (i) skill and comfort level with computer input tools like mouse and keyboard; (ii) the tick and point size of the underlying instrument; (iii) current and historical volatility in the underlying instrument traded; and (iv) current velocity (rate of change) in market prices.

Due to the many factors that could influence trader preferences, a preferred embodiment of the present invention provides a high degree of flexibility and customization for the trader. By using the disclosed trading tool having the convergence method described herein, traders will have the ability to set three variables that influence the speed and method of convergence for the instruments being trading: (1) convergence method, (2) convergence speed, and (3) convergence point location.

Convergence Speed Settings

Figure 11:
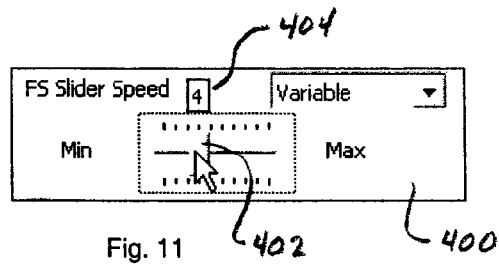

The market depth tool 10 provides a user speed interface giving the user the ability to select from a number of different speed settings for convergence. FIG. 11 depicts a GUI section of the user's screen allowing movement of a bar 402 of slider speed tool 400 to the desired speed. In a preferred implementation, the speed interface has 10 settings, with the settings over the range from 1 to 10 corresponding to delay intervals ranging from 250 milliseconds (slowest) to 25 milliseconds (fastest). It will be appreciated, however, that more or fewer settings may be provided and that the delay intervals can fall within other broader or narrower ranges. The perceived rate of speed of the convergence movement to the user is determined by both the slider speed setting and the convergence method that is employed (see Convergence Method Settings below). The desired speed setting can be viewed in the window 404 associated with the speed tool 400 upon adjustment of the slider speed setting tool. Alternatively, if desired, the system may be configured to permit the user to type the desired speed setting into window 404.

Convergence Method Settings

Figure 12:
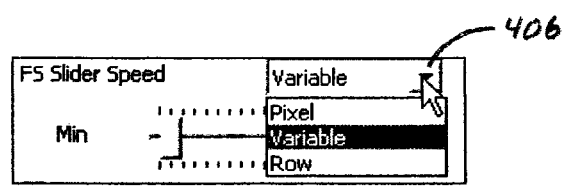

Slider speed tool 400 is provided with drop down menu 406 as seen in FIG. 12. This menu permits the user quickly to select from three different convergence methods in the convergence tool settings. A brief description of each is provided below.

(1) Pixel—When the "Pixel" convergence method is selected, the CP and the CMP will converge by one pixel following each delay interval, resulting in a constant rate of convergence as described above.

(2) Variable—When the "Variable" convergence method is selected, a non-linear rate of convergence that varies depending on the distance between the central market point and the convergence point will occur, as described above in connection with the variable rate of convergence.

(3) Row—When the "Row" convergence method is selected, a constant rate of convergence will be applied and the CMP will converge on the CP by the length or height of a single price entry cell in the displayed continuum of prices, as described above. This convergence type is a variation on the constant rate of convergence described above.

Moving the Convergence Point

In one preferred embodiment of the present invention, the user can position the convergence point at a desired location within the graphical area where the price continuum is displayed on the trading tool. Positioning can be accomplished by such action as a single or double click at the point where the new location of the CP is desired. Alternatively, the CP can be moved by dragging the CP from its current position and dropping it to a new location. That location then becomes the new CP, and the CMP will converge towards that new point.

Figures 13A, 13B, 13C:
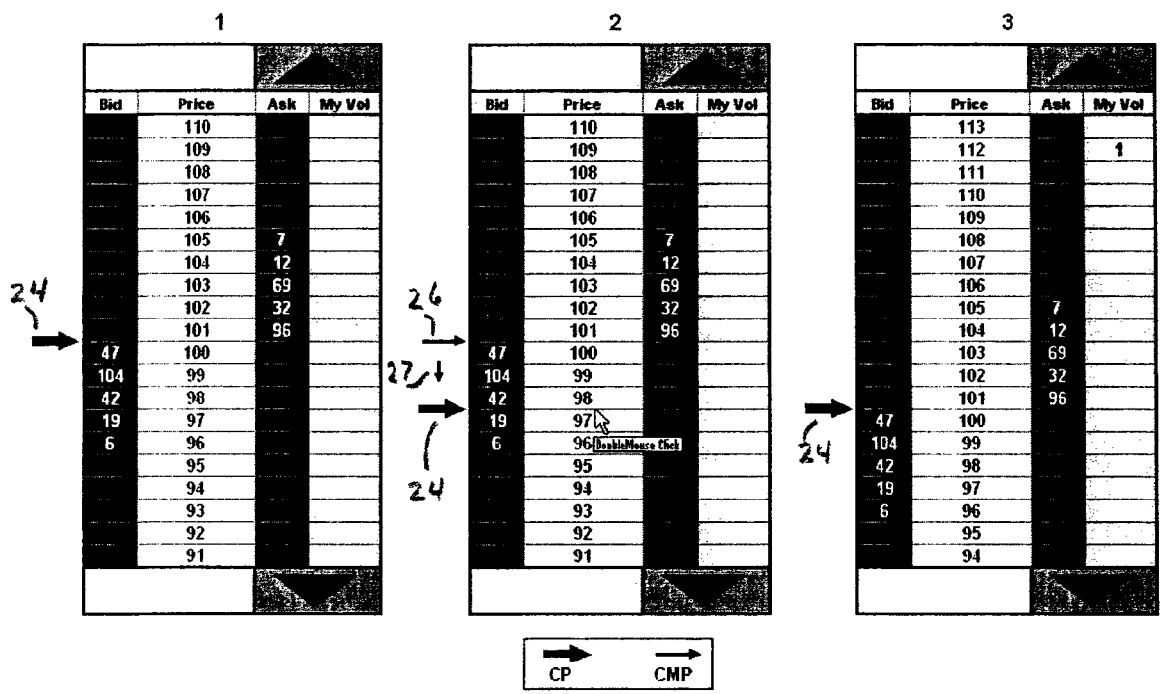

FIGS. 13*a*-13*c* depict a manual move of the convergence point 24. FIG. 13*a* shows convergence of the CMP and the CP, represented by the CP 24. In FIG. 13*b*, the user has placed the mouse cursor in the price column between prices 98 and 97 and performed an action, such as a mouse click. The CP 24 is then moved to that location. The CMP 26 will then begin to converge, as shown by arrow 27, upon the new location of the CP 24 until both points are once again at equilibrium at the new CP location, as seen in FIG. 13*c*.

Trading Functions

Using the market depth tool of the present invention, a trader can place a trade by specifying a trade quantity corresponding to the desired trade price within the market depth display tool.

Figures 14A, 14B, 14C:
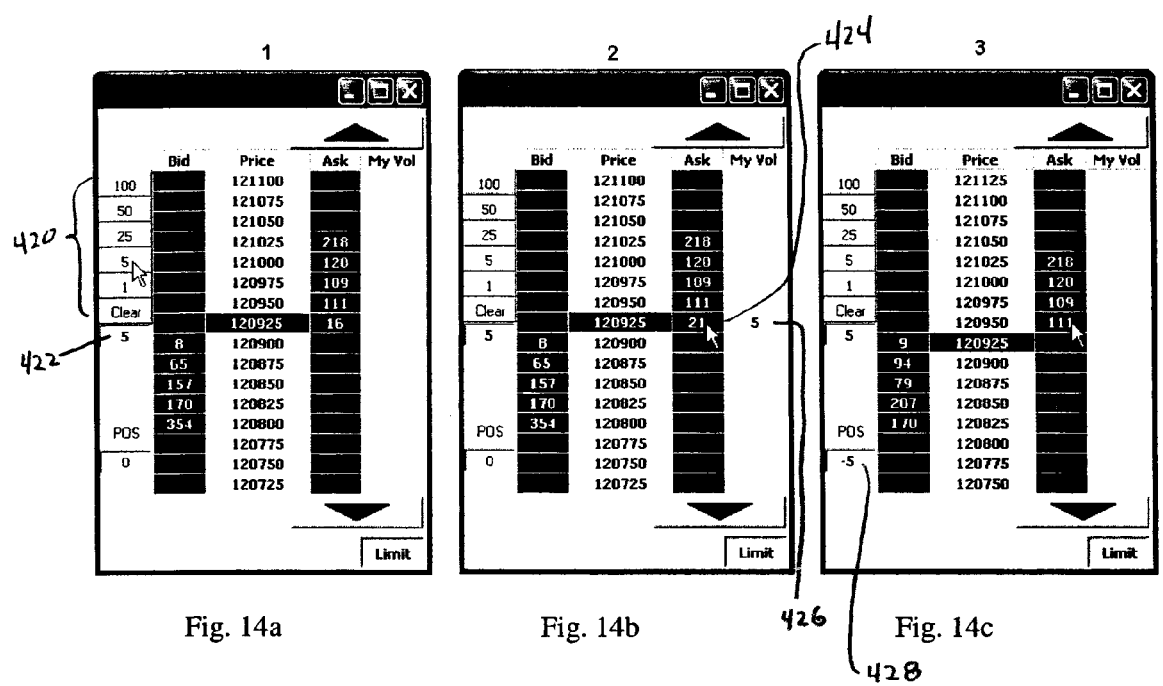
Figure 15A:
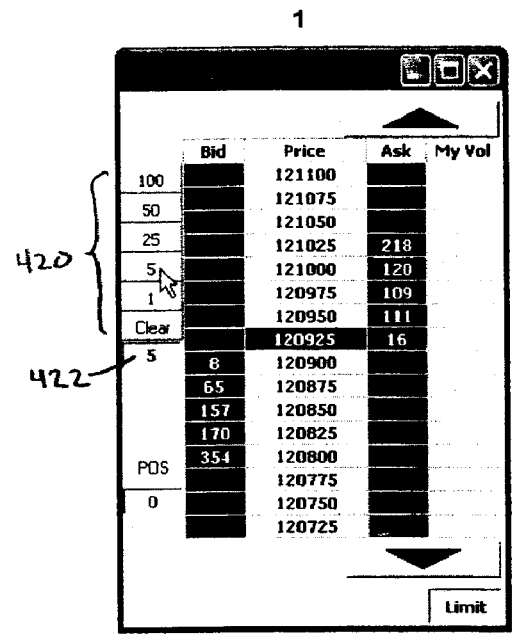
Figure 15B:
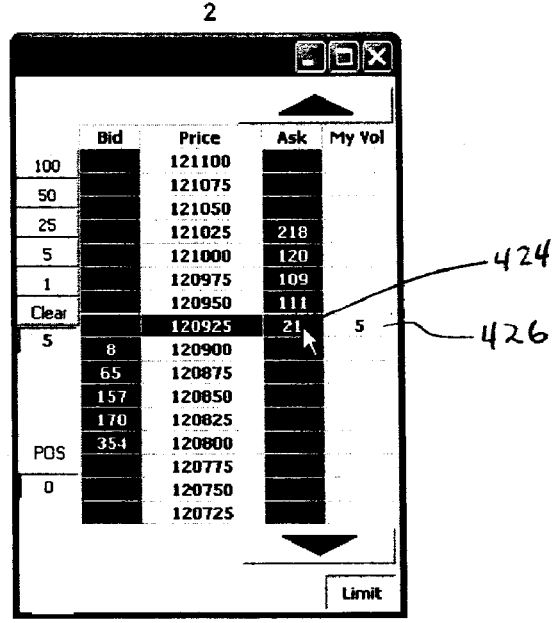
Figure 15C:
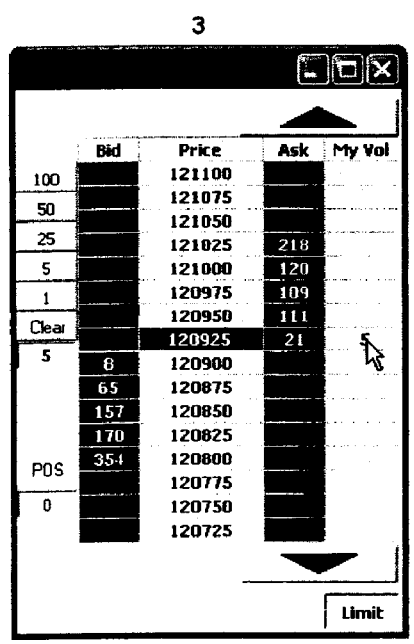
Figure 15D:
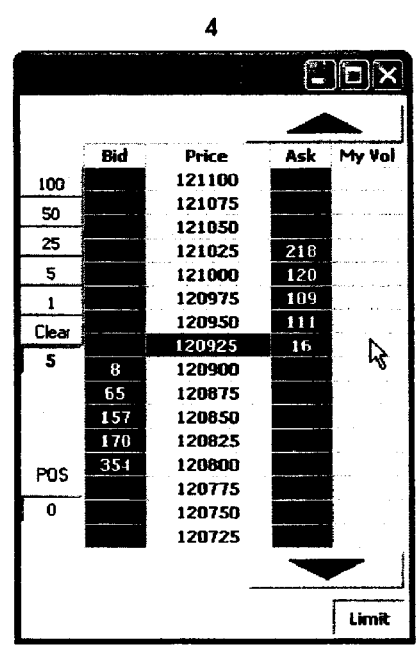

FIGS. 14*a*-14*c* show how trades can be made with one embodiment of the present invention. As an overview, a trader can place a trade by specifying a trade quantity and, for example, single clicking the left mouse button on a region of the graphical interface that corresponds with his or her desired trade price within the market depth display. It should be noted that the term "single clicking" or "single click" as used throughout this disclosure means a single action by a user or a number of actions by a user within a short period of time. Thus, for example, a double-clicking action or a single click followed by another single click in a confirmation screen would all be considered a "single click". Also, it will be appreciated that even though a preferred embodiment of the invention contemplates actions by a user using a left click button of a mouse, it is within the scope of the invention that any mouse button or other input device (such as a keyboard, mouse wheel, track ball, touch pad, etc.) can be used to execute orders and send commands to the trading software. Similarly, reference to a left mouse button click is intended to also cover the same action using a right mouse button click, and vice versa.

If an order has been placed but is unfilled, the order will be shown as a numeric quantity in an area that corresponds with its price and position in the market depth within the display (the "My Vol" column). The trader can cancel or withdraw this order from the market by positioning a mouse pointer over the numeric quantity that represents the order in the My Vol column and single clicking the left mouse button. The order placement and order withdrawal functions are illustrated in FIGS. 14 and 15.

FIG. 14*a* shows a trader selecting an order quantity of five by left mouse clicking the "5" in the column of order volume buttons 420. This quantity is confirmed in the display region 422 below the order quantity shortcut buttons in column 420, which displays the number "5". In FIG. 14*b*, a sell order is shown being submitted into the market with a price of 120925 by left mouse clicking into a cell 424 corresponding to that price in the market depth in the "ask" column. The order of "5" joins the other orders offered at that price, and the total quantity offered for the price 120925 increases from "16" (shown in FIG. 14*a*) to "21", shown in FIG. 14*b*. The number "5" that appears in the cell 426 to the right of the ask quantity in the My Vol column 18 (see FIG. 3*a*) represents the portion of the total market depth that belongs the trader (i.e., his working order to sell contracts).

In FIG. 14*c*, the market is shown to be bid at 120925, which is sufficient to fill the sell order that the trader has working in the market. The position ("POS") window 428 shows a value of "−5" which indicates that the trader is now short 5 contracts. The quantity in the My Vol column 18 is removed when the order is filled.

FIG. 15 shows how trades can be canceled in one embodiment of the present invention. First, an order quantity of 5 is selected by a left mouse click on the order volume buttons 420. This quantity is confirmed in display region 422. Second, the trader joins the offer at the price of 120925 by left mouse clicking in cell 424, which corresponds to that price in the market depth "ask" column. As shown in FIG. 15*b*, the ask quantity jumps from 16 to 21 and the trader's working order quantity of 5 appears in cell 426 of the My Vol column 18. In order to cancel the order, the trader simply places the mouse over the order quantity display of "5" in the My Vol column 18 in cell 426 and clicks the left mouse button to cancel the order, as shown in FIG. 15*c*. FIG. 15*d* shows the working order quantity removed from the My Vol column 18, confirming that the order has been canceled.

"Ladder Ticket" Description

The convergence and trading processes described herein detail specific functions and processes of a more complex electronic trading tool. FIG. 16 represents a graphical user interface of such complex tool, which is a detailed representation of the tool 10 shown in FIG. 1*b*. The trading tool described in the following is, for convenience referred to as a "Ladder Ticket" because it provides a "ladder" style trading environment. It should be appreciated that FIG. 16 depicts only one electronic trading tool. Oftentimes traders engage in simultaneous trading of different vehicles or simultaneous trading of different accounts. In those instances, the monitor screen 1 (see FIG. 1*b*) many contain two or more of the displays of FIG. 16, each of which represents a different vehicle or account. The present invention permits the trader to toggle between such multiple displays while trading.

For purposes of describing FIG. 16 only, the following parenthetical numbers and letters relate to the numbering sequence found on FIG. 16 and should not be read as referring to any other numbering sequence found in other Figures.

Thus, with reference to FIG. 16, the following describes the details and functionality of the Ladder Ticket depicted there:

(1) Controls located on the first row of the Ladder Ticket (a) The "Center All" button permits instantaneous convergence of the central market point upon the convergence point and can be activated by a mouse click on this button. It can also be activated by depressing, for example, the keyboard space bar (centering the central market point on the convergence point of the highlighted, or active, Ladder Ticket if multiple tickets appear on the same monitor screen) or by pressing the control (Ctrl) and space bar simultaneously (center all ladders of all displayed Ladder Tickets). The down arrow to the right of the "Center All" button presents a dropdown menu where the user can select the method for calculating the central market price (CMP). The available options preferably include:

Center on Last Trade—which causes the CMP to be set to the last trade price.

Center on Bid—which causes the CMP to be set to the best bid price.

Center on Mid—which causes the CMP to be set to the (best bid+best offer)/2

Center on Ask—which causes the CMP to be set to the best offer.

(b) More—The "More" button controls a function to show or hide controls (3) through (10) at the top of the Ladder Ticket. The graphic Ladder Ticket of FIG. 17 shows a Ladder Ticket with these controls hidden.

(2) Controls located on the second row of Ladder Ticket.

(a) Change Ladder Ticket Name—This control (represented as an "ABC" with a horizontal line drawn through the center) allows a user to customize the name of the Ladder Ticket to his or her preference. The changed name will be displayed on the top header bar of the Ladder Ticket (the name is currently shown as "Ladder [0001]").

(b) Resize columns—This control (shown as parallel lines with extending horizontal arrows) adjusts the cell size of columns and/or rows in the market tool to accommodate the actual width size of the text within those cells.

(c) Increase/decrease font size—This control (shown as a capital "A" with a double headed arrow) toggles through five preset font size settings to adjust the overall size of the fonts and, optionally, Ladder Ticket itself.

(d) Roll back—This control (shown with a cursive down arrow) enables the trader to add a new contract, in descending chronological order, to the existing contract(s) displayed in the Ladder Ticket. Clicking the roll back button displays the next contract, chronologically, in that trading instrument to the right of the existing ticket. Subsequent operation of the roll back button will display more instruments in descending chronological order until all available instruments in the market are displayed.

(e) Roll forward—This control (shown with a cursive up arrow) enables the trader to add a new contract, in ascending chronological order, to the existing contract(s) displayed in the Ladder. Clicking the roll forward button displays the next contract, chronologically, in that financial instrument to the right of the existing ticket. Subsequent operation of the roll forward button will display more instruments in ascending order until all available instruments in the market are displayed.

(3) Controls on third row of the Ladder Ticket (a) Increase/decrease depth size—This control permits the trader to increase or decrease the number of price rows (or columns) displayed in the Ladder Ticket. For example, in FIG. 16, the market depth is shown for the price range of 10440 to 10454.

(b) Increase/decrease price cell height—This control permits the trader to increase or decrease the height (or width if the market tool is displayed horizontally) of the price cells within the Ladder Ticket.

(c) Narrow font—When checked, this control will narrow the font used within the Ladder Ticket and decreases the overall width of the Ladder Ticket.

(4) Enable My Volume Column—This check box controls the show/hide appearance of the "MyVol" column of the Ladder Ticket. When unchecked, the My Vol column is hidden and the Ladder Ticket preferably is not tradable (i.e., is in view only mode).

(5) Enable Total Volume—This check box controls the show/hide of the "TotVol" column 43 in the Ladder Ticket.

(6) Show P&L Grid—This check box controls the show/hide of the AvgPx, P&L, and RTP information depicted at the bottom of the Ladder Ticket (see numbers (21), (25), and (40) respectively below).

(7) Show status grid—This check box controls the show/hide of the "VOL", "Open" and "NetChg" information depicted at the bottom of the Ladder Ticket (see numbers (22), (26), and (41) respectively below).

(8) Show order count grid—This check box controls the show/hide of the "Bid Order Count" and "Ask Order Count" information depicted at bottom of the Ladder Ticket. These fields show the total number of working buy and working sell contracts respectively that the trader has in his or her order book. In this example, these counts are hidden.

(9) Show order types—This check box controls the show/hide of the "Flatten" and order type buttons depicted at the bottom of the Ladder Ticket.

(10) Show order size shortcuts—This check box controls the show/hide of the order size shortcut column (see item (12) below).

(11) Select account number to trade—This dropdown menu identifies all of the accounts that a trader has permission to trade, by identification number, name, or other identifying symbol.

(12) Order quantity shortcuts—These shortcut buttons correspond to the order shortcut column 420 of FIGS. 14 and 15. The value in each action button may be adjusted by the user by placing a cursor on a button and incrementing (right mouse click) or decrementing (left click) the number in the quantity box. The shortcut values for each of these buttons may also be changed by holding down a control key, such as the control (Ctrl) key, on the keyboard, right (or left) mouse clicking in the desired quantity button, and typing in the new desired quantity.

(13) Left mouse click trade quantity—This control cell determines the order quantity that is sent when the trader submits a buy or sell order via a left mouse click in the bid or ask column. The value can be typed in from the keyboard, or entered/changed by using the order quantity shortcut buttons at (12).

(14) Default order quantity—This control permits an optional order quantity value to be entered. The left click order quantity value will revert to the default order quantity value following every order submission.

(15) Market depth buy order display and submit buy order—This is the bid area of the grid that displays the market depth and is comparable to the bid, price and ask columns, 16, 14 and 12 of 16 FIGS. 1 and 3. Each entry in a bid cell corresponds to a price in the price column and represents the total number of contracts that are bid at that price. For example, the entry 36 in the bid column of FIG. 16 represents the total number of contracts or vehicles that are in the market at the price of 10444. A single left click of the mouse in this column will send an order to buy the number of contracts in the left click order quantity box (13) at the corresponding price level. A single right click of the mouse will send an order to buy the number of contracts in the right click trade quantity box (see (18) below) at the corresponding price level.

(16) Position indicator ("POS")—This area shows the current net position in this contract of the trader account that is selected in the account box (11). A long position may be displayed with, for example, a blue background and a short position may be displayed with, for example, a red background for ease of reference, although a colored background is not essential.

(17) Price check threshold ("PCT")—This area of the market tool permits entry of a number of price levels. When a number is entered into the PCT box, all of the trader's orders to buy or sell will be checked against the current best bid and offer in the market before submitting the order to the exchange. The PCT gives a trader the ability to perform a price reasonability check in that the system will reject an order if the best bid or ask is farther away than the number of price levels set in the PCT box. If a limit price on a buy order exceeds the best offer by more price levels than is set in the PCT box, the system will reject the order before sending it to the exchange. If the limit price on a sell order is less than the best bid by more price levels than is set in the PCT box, the system will reject the order before sending it to the exchange.

(18) Right click trade quantity ("RCQ")—This control cell determines the order quantity that is sent when the trader submits a buy or sell order via a right mouse click in the bid or ask column. This quantity value may be entered via the keyboard, or a dropdown menu (not shown) having a series of quantities, as in item (12), may be provided.

(19) Default right click trade quantity—This control cell permits an optional value to be entered. The right click order quantity value (18) will revert to this default order quantity value (19) following every order submission.

(20) Pull all buy orders ("Pull Buys")—This control withdraws, or pulls, all of the trader's working buy orders from the market for the financial instrument being traded.

(21) Average price of open position ("Avg Px")—The Avg Px shows the average price of the trader's current open position in this contract, if any.

(22) Today's exchange contract volume ("Vol")—The Vol cell shows the total trade volume in this contract at the exchange for the current trading session.

(23) Pull all orders ("Pull All")—This control withdraws, or pulls, all of the trader's working orders (buys and sells) for this contract.

(24) Flatten this contract open position ("Flatten")—A mouse click on this button will send a market order into the exchange to offset any open position the trader has in this contract. This button is disabled by default and must be enabled by the trader in the settings area of the Ladder Ticket (see item (24) in FIG. 18).

(25) Today's profit/loss ("P&L")—This area displays the total profit/loss for this contract for the trading session based on the trader's buy and sell activities and the inside market price.

(26) Opening price ("Open")—The opening price of this contract for the current trading session is shown in this area.

(27) Set order type to limit order ("Limit")—This control sets the order type of orders executed from this Ladder Ticket as "Limit" to place an order at a specific price.

(28) Set order type to immediate or cancel ("IOC")—This control sets the order type of orders executed from this Ladder Ticket as "Immediate or Cancel" to either fill the order, or a portion thereof, immediately or cancel the order.

(29) Enable highlighted price—This control box turns on/off the ability to highlight a price within the Ladder Ticket. If enabled, the central market price is highlighted by, for example, a heavier border (see (34) below) when the trader centers the market using control (1)(a).

(30) Highlighted price—This area reproduces the last highlighted price when the enable highlighted price control (29) is turned on and a price has been marked.

Figure 18:
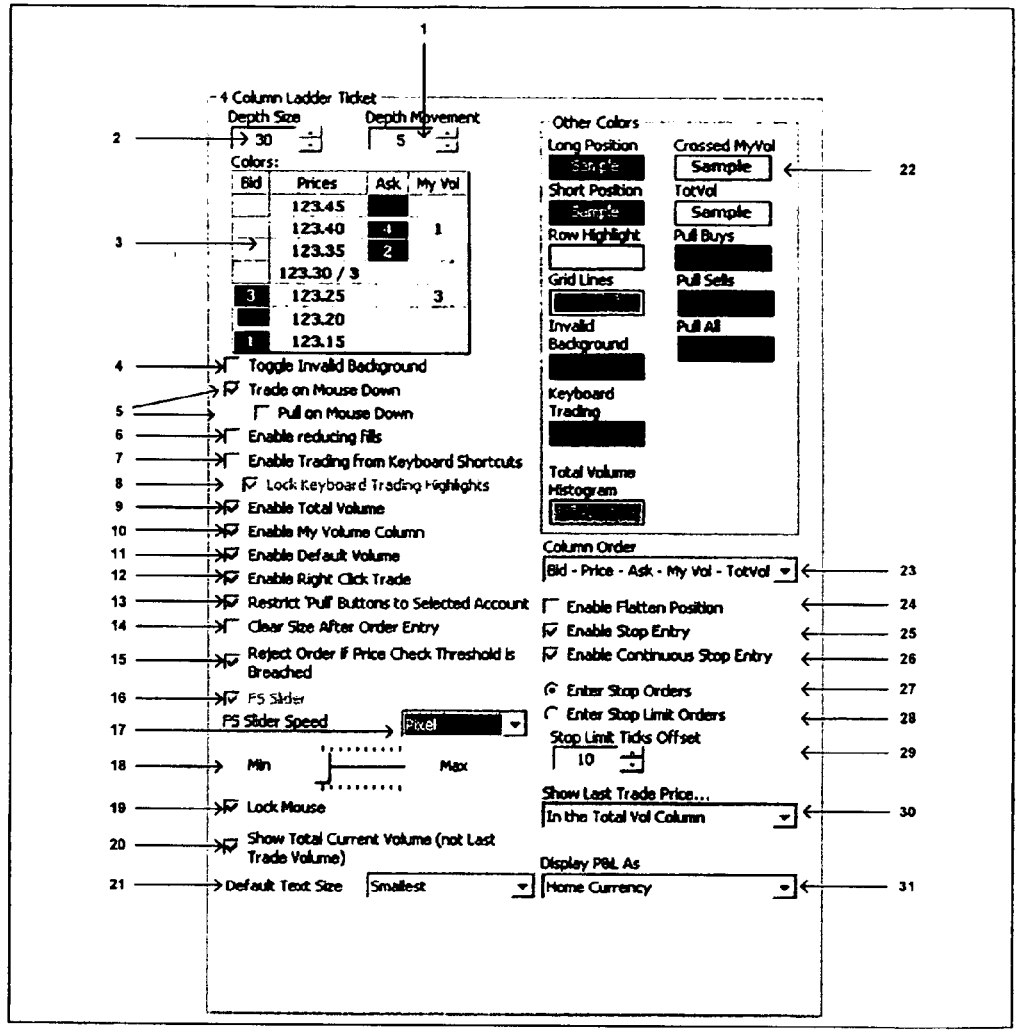
FIG. 18 shows an embodiment of a portion the graphical user interface for user control of the functionality and appearance of the interface of FIG. 16.

(31) Scroll prices down—This control scrolls prices in the price column down by the number of rows that is set in the depth movement parameter (see item (1) in FIG. 18) in the Ladder Ticket settings area. This scroll is comparable to arrow 22 of FIG. 4.

(32) Manual price format change—This control allows traders to manually add in price levels for a contract that under certain market conditions (i.e., near expiry) will allow trading in half or quarter ticks or some other trading amount or increment.

(33) My working order volume display and order management (MyVol)—This column displays the total number of contracts that the trader has working to buy or sell at each price level. A single mouse click on a working order quantity in this column will cancel the order. To move an order to another price level, the trader may click on the order in the MyVol column holding the left mouse button down, drag it to the new desired price level, and release the button. This provides the trader an efficient way to quickly cancel and modify orders in reaction to market changes. This column (33) is comparable to MyVol 18 in FIGS. 1 and 3.

(34) Marked price—This area provides an example of a price level that is marked if the trader chooses to enable the highlighted price feature (see (30) above). The Center All button (see item (1)(a)) of FIG. 16) provides a ready mechanism for marking a price.

(35) Market depth sell order display and submit sell order—This is the ask area of the market tool that displays the market depth. Each cell corresponds to a price in the price column and a number in this cell represents the total number of contracts that are offered at the price. In FIG. 16, there are a total of 35 ask contracts in the market at a price of 10449. A single left click of the mouse in this column will send an order to sell the number of contracts in the left click order quantity box (see (13) above) at the corresponding price level. A single right click of the mouse will send an order to buy the number of contracts in the right click trade quantity box (see (18) above) at the corresponding price level.

(36) Trade volume at price since last change—When the cell in the TotVol column (see (43) below) corresponds to the last traded price, this cell displays the total number of contracts that has traded at the currently traded price since the last price change. In FIG. 16, the number 6 in the TotVol column indicates that 6 contracts traded at the current price of 10448.

(37) Price column and CP positioning—This is a vertical arrangement of the continuum of prices (comparable to the price column 14 of FIGS. 1 and 3) that are available to trade in this contract. Rolling the mouse roller up and down with the mouse arrow in this region will scroll the prices higher and lower respectively. Pressing the mouse roll button, or track wheel, down will instantly align the CMP with the CP. A double click of the left mouse in this region will position the CP at the double click location. Otherwise, the price column may be moved by scrolls (31) and (39).

(38) Total volume traded at price—Each cell in the TotVol column (43) shows the total number of contracts traded at each price level since the trader logged onto the system.

(39) Scroll prices up—This control scrolls prices in the price column up by the number of rows that is set in the depth movement parameter (see item (1) of FIG. 18) in the Ladder Ticket settings area.

(40) Round trip counter ("RTP")—This area shows the total number of contract round trips (i.e., total buys and total sells) done by this trader during this session.

(41) Net price change ("NetChg")—This area shows the net change in price in this contract from the prior session settlement price.

(42) Set order type to stop (or stop limit) ("Easy Stop")—Sets the order type of submitted order to "Stop" or "Stop Limit" (whichever is specified in the ladder settings area (see items (25), (27), (28), and (29) of FIG. 18).

(43) Total volume ("TotVol")—This column shows the total volume of the contract traded during the current trading session and the corresponding prices for such volume.

FIG. 17 depicts the Ladder Ticket of FIG. 16, with the More button (1)(b) set to hide mode, thus hiding functions (3) through (10) described above.

Ladder Ticket Settings

Turning now to FIG. 18, that Figure shows representative controls and settings that are available to establish certain parameters applied when the market tool 10 as depicted in FIG. 16, is used. For purposes of the description of these controls and settings, the following parenthetical numbers are used which are to be read to correspond to the numbering found in FIG. 18 and not to any other Figure included herein (unless expressed to the contrary). Thus, FIG. 18 should be read in conjunction with the following descriptions.

(1) Depth movement—This cell controls the number of rows that prices will scroll up or down each time the trader hits the scroll buttons on the Ladder Ticket (see (31) and (39) of FIG. 16). The trader can change the numbers shown in this cell by, for example, incrementing or decrementing the number using the up/down buttons.

(2) Depth size—This cell controls the total number of rows of prices that are displayed in the Ladder Ticket, allowing the trader to lengthen or shorten the Ladder Ticket to match user preferences. The trader can override this setting at the individual Ladder Ticket level using the Ladder Ticket size controls (see (3) of FIG. 16).

(3) Ladder grid color attributes—This control allows a trader to set the default background and text colors for each of the columns (Bid, Prices, Ask, My Vol, TotVol).

(4) Toggle invalid background—Checking this box toggles the colors of the grid displays in the settings window to display the effect this has on the selected text colors.

(5) Trade (and pull) on mouse down—When "Trade on mouse down" is checked, the down action of the mouse click will submit orders into the market when clicking in the bid or ask column. When unchecked, it is the up action of the mouse click (that follows the down click) that submits the order. When using "Trade on mouse down" traders are able to submit orders slight faster than when this box is unchecked. When "Pull on mouse down" is checked, it is the down action of the mouse click that pulls a working order from the "My Vol" column of the Ladder Ticket (see (33) of FIG. 16). When this box is checked, it is not possible for a trader to cancel/replace a working order to another price level within the Ladder Ticket. Because the down action of the mouse cancels the order immediately, the trader is unable to drag and drop the working quantity to another price level using the mouse.

(6) Enable reducing fills—Checking the enable reducing fills box activates the reducing fills functionality on the ticket. A reducing fill is similar to an IOC (see (28) of FIG. 16); however, when an order is part-filled, the size of the next order is reduced by the amount of the part-fill. This enables a trader to immediately hit/join bids/offers, by simply clicking on a price/volume without having to enter new volumes in the order volume box (see item (13) of FIG. 16), and trading until the reduced volume reaches zero.

(7) Enable trading from keyboard shortcuts—When checked, trading shortcut keys are enabled on the keyboard, to permit use of keyboard shortcuts to trade on the Ladder Ticket without using the mouse. Traders advantageously can also map these keyboard shortcuts to game console controls to allow for trading via game controller interfaces. Keyboard shortcuts may include:

a. bids
  i. Q=Moves the desired bid price up.
  ii. A=Submits a bid order at the current size and highlighted bid price.
  iii. Z=Moves the desired bid price down.
b. Asks
  i. Y=Moves the desired ask price down.
  ii. H=Submits ask order at the current size and highlighted ask price.
  iii. N=Moves the desired ask price down
c. Pulling orders
  i. P=Pulls orders at the current price
  ii. Shift+P=Pulls all orders for the instrument
  iii. Shift+I=Pulls all bid orders for the instrument
  iv. Shift+O=Pulls all ask orders for the instrument
d. Tab=Use tab key to switch between columns
e. Shift+F=Flattens position in the active ladder ticket.
f. Page Up =Scrolls grid up
g. Page Down =Scrolls grid down
h. Space Bar =Centers the grid
i. ==Displays the grid centering menu
j. Number pad numbers=Enters/edits the order size in quantity box
k. Number pad decimal point=Clears the order size (8) Lock keyboard trading highlights—When checked, the positioning, of the keyboard shortcut highlights or submitting buy and sell orders will be locked to the prices when they are set. When unchecked, the position of the keyboard shortcut highlights will move relative to changes in the actual bid/offer in the market. For example, if a trader has the keyboard shortcut highlights set on the current bid and offer and this box is unchecked (not locked) then the bid and offer shortcut highlights will move along with the actual bid and offer of the market.

(9) Enable total volume—When checked, the TotVol column (see (43) of FIG. 16) appears on the Ladder Ticket. This column displays the total volume of all orders traded at that price since the user started monitoring that contract (i.e., since they logged on) using a bar type histogram, shown as the gray background areas in the Tot Vol column 43 of FIG. 16.

(10) Enable My Vol column—This box controls the show/hide of the "MyVol" column of the Ladder Ticket. When unchecked, this column is hidden and the Ladder Ticket is not tradable (i.e., is view only).

(11) Enable default volume—When checked, the default volume boxes are enabled and visible on the Ladder Ticket (see (14) and (20) of FIG. 16). When unchecked, the boxes are removed from the Ladder Ticket.

(12) Enable right click trade—When checked, the right click trade quantity box is enabled and visible on the Ladder Ticket (see (18) of FIG. 16). When unchecked this box is removed and disabled.

(13) Restrict "pull all" buttons to selected account—When checked, a "pull all" command done from the pull all button (see (23) of FIG. 16) or a keyboard shortcut will pull orders only for the account selected on the Ladder Ticket (see (11) of FIG. 16). When unchecked, these Pull All commands will pull all orders for all accounts in this instrument for which the trader has permission to trade.

(14) Clear size after order entry—When checked, the order quantity box (see (10) of FIG. 16) will always clear down after an order is submitted. When checked, the trader must select a new quantity before doing each trade.

(15) Reject order if price check threshold is breached—Enables the PCT functionality on the Ladder Ticket and displays the PCT box (see (17) of FIG. 16).

(16) FS slider—Turns on the convergence feature. This box cannot be unchecked.

(17) FS slider convergence method—Dropdown menu used to select between "pixel", "variable" or "row" convergence methods. (See FIGS. 11 and 12 and related discussion).

(18) FS slider speed—Slider tool used to increase or decrease the convergence speed on the Ladder Ticket. (See FIGS. 11 and 12 and related discussion).

(19) Lock mouse—When checked, the mouse will stick to a cell on the "bid" or "ask" columns of the Ladder Ticket when it is covered over a particular price level in that column. The mouse pointer will then move up and down with the prices as the bids/offers change in the market and the prices move in response to these changes.

(20) Show total current volume (not last trade volume)—If unchecked the last trade cell in the TotVol column (see (36) in FIG. 16) shows the volume of the last trade only. When checked the last trade cell in the TotVol column shows the cumulative volume of all trades since the last price change.

(21) Default text size—Dropdown menu where trader can select the default text size for newly created Ladder Tickets. There are five different text size settings from which to choose. The default text size for individual Ladder Tickets can be overridden on each ticket.

(22) More ladder color attributes—Allows trader to customize color attributes of many of the Ladder Ticket background and text colors. The background color can be changed by right mouse clicking in the color settings region and selecting the desired background color. The text color can be changed by left mouse clicking in the color settings region and selecting the desired text color.

(23) Column order—Dropdown menu that allows the trader to modify the order of the columns in the Ladder Ticket.

(24) Enable flatten position—Enables the flatten position button in the Ladder Ticket. (see (24) in FIG. 16).

(25) Enable stop entry—When checked, a "stop orders" or "EasyStop" button appears on the Ladder Ticket (see (42) in FIG. 16) which enables the entry of stop orders as an order type from the Ladder Ticket.

(26) Enable continuous stop entry—When checked and "stop orders" button is selected as an order type on the Ladder Ticket, all subsequent orders submitted from the Ladder Ticket will be stop orders until the trader selects another order type. If this si unchecked and the trader selects "stop orders" as an, order type, only the next trade will be submitted as a stop order. After that order is submitted, the order type will automatically revert back to "limit".

(27) Enter stop orders—If stop entry is enabled (see (25) above), the user must specify whether stop orders are to be entered as a "stop" or "stop limit".

(28) Enter stop limit orders—If stop entry is enabled (see (25) above), the user must specify whether stop orders are to be entered as a "stop" or "stop limit".

(29) Stop limit tick offset—If "stop limit" entry is selected (see (28) above), the figure entered in this box determines the price of the limit order entered if the stop price is triggered. The price on the limit order will be this many price levels greater (or less than the stop trigger.

(30) Show last trade price location—Drop down menu where trader can select the location that they want to see the last trade quantity figure (see (36) FIG. 16). Trader can choose between showing it in the "TotVol" column (is the default) or to the right of the price in the "price column" (separated by a slash "/").

(31) Display P&L as currency—Dropdown menu that allows the trader to choose if they want to view their profit/loss in their home currency, the currency in which the contract trades, or as a tick value.

The foregoing market depth tool has been described with reference to certain presently preferred embodiments, it is to be understood that the invention is not to be limited to the disclosed embodiments, but to the contrary, is intended to cover various modifications and equivalent arrangements and processes that are within the spirit and scope of the appended claims.

What is claimed is:

1. A trading system display, comprising
   a dynamic display including a computer having a graphical user interface responsive to input from a user input device, said display including an area displaying a plurality of axes, said plurality of axes comprising a price axis adapted to display a plurality of prices for at least one trading vehicle, a bid axis adapted to display a range of bids and showing at least one bid for said at least one trading vehicle, said at least one bid being associated with a first price of said prices on said price axis, and an ask axis adapted to display a range of asks and showing at least one ask for said at least one trading vehicle, said at least one ask being associated with a second price of said prices on said price axis, with the lowest price associated with an ask and the highest price associated with a bid defining a region of said price axis representative of the inside market of said at least one trading vehicle;
   a convergence point positionable, adjacent said plurality of axes, by a user of said trading system display, wherein
   the computer automatically moves said price axis in the direction of said convergence point in response to a change in the inside market of said at least one trading vehicle until said region is centered on said convergence point.

2. The trading system display of claim 1, further including a first area displaying information definable by a user of the trading system, such information relating to the vehicle being traded and including one or more of an identification of the vehicle being traded, the open price for said vehicle, the prior trade day close price for said vehicle, the last traded price, the last traded quantity, the user's ask position, the user's bid position, and the user's net position, and
   a second area adapted to receive input from said user input device to effect at least one of the following actions: delete a predefined number of bid orders, delete a predefined number of ask orders, predefine a volume of bid orders, predefine a volume of ask orders, limit bid order volume in response to the inside market; limit ask orders in response to the inside market, initiate a predefined ask order in response to the inside market, and initiate a predefined bid order in response to the inside market.

3. The trading system display of claim 1, further including a scroll control responsive to user input to move said price axis along its length.

4. The trading system display of claim 1, wherein the convergence point is rendered not viewable by the user of the system.

5. A method of trading investment vehicles performed by a computer, comprising:
   providing a dynamic display having a graphical user interface controlled by the computer and responsive to input from a user input device, said display including an area displaying a plurality of axes,
   said plurality of axes comprising a price axis adapted to display a plurality of prices for at least one trading vehicle, a bid axis adapted to display a range of bids and showing at least one bid for said at least one trading vehicle, said at least one bid being associated with a first price of said prices on said price axis, and an ask axis adapted to display a range of asks and showing at least one ask for said at least one trading vehicle, said at least one ask being associated with a second price of said prices on said price axis, with the lowest price associated with an ask and the highest price associated with a bid defining a region of said price axis representative of the inside market of said at least one trading vehicle;
   providing in said system a convergence point positionable, adjacent said plurality of axes, by a user of said trading system display, wherein
   said price axis is automatically moved by the computer in the direction of said convergence point in response to a change in the inside market of said at least one trading vehicle until said region is centered on said convergence point;
   providing at least one input region in said system to receive a trade order from the user of said system; and
   initiating a trade of an investment vehicle based on said trade order.

* * * * *